(12) United States Patent
Takasaki et al.

(10) Patent No.: US 8,919,659 B2
(45) Date of Patent: Dec. 30, 2014

(54) HEATING SYSTEM AND HEATING SYSTEM CONTROL METHOD

(75) Inventors: Shinichi Takasaki, Osaka (JP); Atsushi Kakimoto, Osaka (JP); Akira Hochi, Nara (JP)

(73) Assignee: Panasonic Corporation, Osaka (JP)

( * ) Notice: Subject to any disclaimer, the term of this patent is extended or adjusted under 35 U.S.C. 154(b) by 471 days.

(21) Appl. No.: 13/393,086

(22) PCT Filed: Jul. 19, 2011

(86) PCT No.: PCT/JP2011/004079
§ 371 (c)(1),
(2), (4) Date: Feb. 28, 2012

(87) PCT Pub. No.: WO2012/014406
PCT Pub. Date: Feb. 2, 2012

(65) Prior Publication Data
US 2012/0152514 A1    Jun. 21, 2012

(30) Foreign Application Priority Data

Jul. 26, 2010   (JP) ................. 2010-166709

(51) Int. Cl.
*F24H 9/20* (2006.01)
*G05D 23/19* (2006.01)
*F24D 19/10* (2006.01)

(52) U.S. Cl.
CPC ........ *F24D 19/1039* (2013.01); *G05D 23/1923* (2013.01); *F24D 19/1024* (2013.01); *F24D 19/1048* (2013.01); *F24D 2200/12* (2013.01)
USPC ............................. 236/1 A; 165/236; 237/2 A

(58) Field of Classification Search
CPC ............. F24D 19/1039; F24D 19/1048; F24F 5/0046; Y02E 60/14; Y02E 60/142; G05D 23/1923; F24H 9/20
USPC ....... 236/1 C; 165/236, 241; 62/236; 237/2 A
See application file for complete search history.

(56) References Cited

U.S. PATENT DOCUMENTS

2005/0005621 A1    1/2005  Jayadev
2013/0263843 A1*  10/2013  Kreutzman ............... 126/615
2013/0266296 A1*  10/2013  Kreutzman ............... 392/308

FOREIGN PATENT DOCUMENTS

| DE | 102009057815 | 6/2010 |
| JP | 2005-257213 | 9/2005 |
| JP | 2008-215692 | 9/2008 |
| JP | 2010-159904 | 7/2010 |
| WO | 2009/036764 | 3/2009 |

OTHER PUBLICATIONS

"Project Planning and Installation Manual, Heat pumps for heating and hot water preparation," Dimplex, Oct. 2007, pp. 1-5, 12 and 189.
Search report from E.P.O., mail date is Aug. 6, 2012.

* cited by examiner

*Primary Examiner* — Marc Norman
(74) *Attorney, Agent, or Firm* — Greenblum & Bernstein, P.L.C.

(57) ABSTRACT

A heating system includes: a heat generation unit which generates heat using electricity supplied through a second power system of a lower electricity rate; a heat storage unit which stores heat generated by the heat generation unit; a heat radiation unit which radiates heat stored in the heat storage unit; and a control unit which causes, when receiving a signal from a power supplier indicating that a supply of electricity through the second power system is to be stopped after an elapse of a predetermined period of time, the heat generation unit generates additional heat that is required while the supply of electricity through the second power system being suspended, during a period of time from when the signal is received to when the supply of electricity through the second power system is stopped.

15 Claims, 13 Drawing Sheets

HEATING SYSTEM AND HEATING SYSTEM CONTROL METHOD

TECHNICAL FIELD

The present invention relates to heating systems, and relates particularly to a heat-pump hot water heating system.

BACKGROUND ART

Energy suppliers in some European counties (such as Germany), for the purpose of electric-load leveling, are offering lower electricity rates to customers in exchange for permitting forcible shutoff of a power source for a heat-pump heater from outside (hereinafter referred to as a shutoff), under a contract with the customers, a predetermined number of times a day for a predetermined period of time (hereinafter referred to as a "shutoff hour").

In this context, to respond to the control from outside as described above, the heat-pump hot water heater includes a relay switch which turns on and off the power source when receiving a ripple signal from an energy supplier.

CITATION LIST

Non Patent Literature

[NPL 1] "Project Planning and Installation Manual, Heat pumps for heating and hot water preparation" Dimplex, October 2007 (page 12, page 189)

SUMMARY OF INVENTION

Technical Problem

In the control method described above, however, when receiving a shutoff signal from the energy supplier, the heat-pump hot water heating system stops operation immediately. This causes decrease in room temperature with time and might possibly compromise user comfort. Particularly, when the power source is shut off without sufficient storage of heat in a heat storage tank or in a housing frame, the room temperature significantly falls, to compromise user comfort.

Therefore, an object of the present invention, which is conceived in view of the above problem, is to provide a heating system and a heating system control method which do not compromise user comfort even when a supply of electricity is temporarily suspended by the shutoff signal.

Solution to Problem

A heating system according to an aspect of the present invention is a heating system which receives a supply of electricity from a power supplier through a first power system and a second power system of which an electricity rate is lower than an electricity rate of the first power system, and maintains a temperature of a target within a predetermined range, and the heating system includes: a heat generation unit which generates heat, using the electricity supplied through the second power system; a heat storage unit which stores the heat generated by the heat generation unit; a heat radiation unit which radiates the heat stored in the heat storage unit; and a control unit which controls, upon receiving the supply of electricity through the first power system, a radiation amount of the heat radiated from the heat radiation unit so as to maintain the temperature of the target within the predetermined range, and the amount of the heat generated by the heat generation unit. In addition, when a signal is received from the power supplier, the control unit causes the heat generation unit to generate additional heat during a period of time from when the signal is received to when the supply of electricity through the second power system is stopped, the signal indicating that the supply of electricity through the second power system is to be stopped after an elapse of a predetermined period of time, and the additional heat being required while the supply of electricity through the second power system is being suspended.

According to the heating system configured as above, it is possible to previously generate, using cheaper electricity, heat required for the period (shutoff hour) during which the supply of electricity through the second power system is suspended. This facilitates maintaining the target temperature within the predetermined range even during the shutoff hour. On the other hand, for the electric supplier, there is an advantage of leveling the amount of electricity supply, which can be achieved by suspending the supply of electricity during a peak hour of power demand in exchange for supplying cheaper electricity through the second power system.

Note that the "target" indicates, for example, "room air" when the heating system is an air conditioner, a "floor surface" when the heating system is a floor heating system, and "water" when the heating system is a water heater.

Furthermore, the heating system may include a prediction unit which predicts the radiation amount of the heat to be radiated from the heat radiation unit while the supply of electricity through the second power system is being suspended. In addition, the control unit may control the heat generation unit such that the heat storage unit stores an amount of heat during the period of time from when the signal is received to when the supply of electricity through the second power system is stopped, the amount of heat being equivalent to the radiation amount predicted by the prediction unit.

The control unit may cause the heat generation unit to generate a maximum amount of heat that can be stored in the heat storage unit when receiving a signal (a pre-shutoff signal). However, in this method, heat loss by radiation increases, and the amount of power consumption also increases, so that a user is not able to enjoy the advantage of using cheap electricity. Thus, by causing the prediction unit to predict the amount of heat radiation to be required during the shutoff hour, it is possible to cause the heat generation unit to generate only the required amount of heat.

In addition, the signal may include information that specifies a shutoff hour that is a period of time during which the supply of electricity through the second power system is suspended. Furthermore, the heating system may include a detection unit which detects the temperature of the target and an outside air temperature. In addition, the prediction unit may predict the radiation amount of the heat to be radiated from the heat radiation unit during the shutoff hour, based on the temperature of the target and the outside air temperature that have been detected by the detection unit.

The method of predicting the amount of heat radiation during the shutoff hour is not limited. However, the prediction unit, for example, first predicts the target temperature, the outside air temperature, and so on during the shutoff hour, based on the target temperature and the outside air temperature at present or in the past that have been detected by the detection unit. Then, it is only necessary to predict the amount of heat radiation required for the shutoff hour based on these prediction results.

In addition, the heat generation unit may include a heat pump cycle which includes: an evaporator which causes a liquid refrigerant to absorb heat from outside air so as to generate a vapor refrigerant; a compressor which compresses the vapor refrigerant generated by the evaporator; a condenser which causes heat exchange between the vapor refrigerant compressed by the compressor and a heat storage material held by the heat storage unit, and stores heat in the heat storage material; and an expansion valve which generates the liquid refrigerant by decreasing pressure of the vapor refrigerant. In addition, at least the compressor may be supplied with electricity through the second power system.

In the heat pump cycle configured as above, the compressor is a constituent element that consumes a largest amount of power; thus, it is possible to effectively suppress increase in electricity rate when using the cheaper electricity for driving the compressor. Note that the "heat storage material" is typically water (hot water), but this is not the only case.

Furthermore, the heat generation unit may include: a plurality of heat pump cycles each of which is the heat pump cycle; and a switching unit which switches between a first state and a second state, the first state being a state in which heat is generated using only one of the heat pump cycles, and the second state being a state in which heat is generated using the heat pump cycles that are cascade-connected. In addition, the control unit may control the amount of heat generated by the heat generation unit, using the switching unit.

The largest amount of heat that can be generated in each heat pump cycle is determined according to the type of a refrigerant to be used. Thus, it is possible to flexibly change the amount of heat generation by preparing a plurality of heat pump cycles using different refrigerants and using part or all of the heat pump cycles in combination.

In addition, the heat radiation unit may include: a mixing valve which mixes, at a mixture ratio that is predetermined, portions having different amounts of heat storage, of the heat storage material held by the heat storage unit; a radiator which is provided near the target and radiates the heat stored in the heat storage material; and a pump which supplies, to the radiator, the heat storage material mixed by the mixing valve. In addition, the control unit may control the amount of the heat radiated from the heat radiation unit, by changing the mixture ratio of the portions of the heat storage material in the mixing valve.

As a typical example, when the heat storage material is water and the storage unit is a tank for storing the water, the water temperature in the tank is different according to each region. More specifically, the temperature of a region into which water (high-temperature water) flows back from the heat generation unit is relatively high, and the temperature of a region into which water (low-temperature water) flows back from the radiator is relatively low. Thus, the control unit can supply the required amount of heat to the radiator by controlling the mixture ratio of water of different temperatures.

In addition, the heating system may include: a heating apparatus which includes the heat generation unit, the heat storage unit, the heat radiation unit, and the control unit; and a heating system control unit which is configured as a separate body from the heating apparatus and includes: the prediction unit; and an operation planning unit which generates an operation plan for causing the heat generation unit to generate an amount of heat equivalent to the radiation amount predicted by the prediction unit, and notify the control unit of the operation plan. In addition, the control unit, when receiving the operation plan from the operation planning unit, may control the heat generation unit in accordance with the operation plan.

According to the configuration above, it is possible to cause the heating system control unit to control not only the heating apparatus but also another device connected to the second power system. In addition, in the case of use in the environment which does not require any control for the shut-off, it is only necessary to provide the heating apparatus.

A heating system control method according to an aspect of the present invention is a heating system control method for controlling a heating system which receives a supply of electricity from a power supplier through a first power system and a second power system of which an electricity rate is lower than an electricity rate of the first power system, and maintains a temperature of a target within a predetermined range, the heating system including: a heat generation unit which generates heat using the electricity supplied through the second power system; a heat storage unit which stores the heat generated by the heat generation unit; and a heat radiation unit which radiates the heat stored in the heat storage unit. The heating system control method includes controlling, upon receiving the supply of electricity through the first power system, a radiation amount of the heat radiated from the heat radiation unit so as to maintain the temperature of the target within the predetermined range, and the amount of the heat generated by the heat generation unit. In addition, when a signal is received from the power supplier, in the controlling, the heat generation unit is caused to generate additional heat during a period of time from when the signal is received to when the supply of electricity through the second power system is stopped, the signal indicating that the supply of electricity through the second power system is to be stopped after an elapse of a predetermined period of time, and the additional heat being required while the supply of electricity through the second power system is being suspended.

Furthermore, the heating system control method may include predicting a radiation amount of the heat to be radiated from the heat radiation unit while the supply of the electricity through the second power system is suspended. In addition, in the controlling, the heat generation unit may be controlled such that the heat storage unit stores an amount of heat equivalent to the radiation amount predicted in the predicting during the period of time from when the signal is received to when the supply of the electricity through the second power system is stopped.

Furthermore, the heating system may include a detection unit which detects the temperature of the target and an outside air temperature. In addition, the heating system control method may include receiving, from the power supplier, the signal including information that specifies a shutoff hour that is an hour during which the supply of the electricity through the second power system is suspended. In addition, in the predicting, when the signal is detected in the obtaining, a radiation amount of the heat to be radiated from the heat radiation unit during the shutoff hour may be predicted, based on the temperature of the target and the outside air temperature that have been detected by the detection unit.

Furthermore, the heating system control method may include generating an operation plan for generating, in the heat generation unit, the amount of heat during the period of time from when the signal is received to when the supply of electricity through the second power system is stopped, the amount of heat being equivalent to the radiation amount predicted by the prediction unit. In addition, in the controlling, the heat generation unit may be controlled in accordance with the operation plan generated in the generating.

In addition, in the controlling, the heat generation unit may be controlled such that the heat storage unit stores an amount of heat equivalent to a predetermined amount of heat storage, when the signal is not received from the power supplier, the signal indicating that the supply of electricity through the second power system is to be stopped after an elapse of a predetermined period of time. Note that "the predetermined amount of heat storage" is typically an amount of heat that exceeds the amount of heat radiated from the heat radiation unit.

In addition, in the controlling, the heat generation unit may be caused to generate additional heat during the period of time from when the signal is received to when the supply of electricity through the second power system is stopped and after the shutoff hour, the additional heat being required while the supply of electricity through the second power system is being suspended. In addition, an amount of heat generated before the shutoff hour may be larger than an amount of heat generated after the shutoff hour.

A heating system control method according to another aspect of the present invention is a heating system control method for controlling a heating system which receives a supply of electricity from a power supplier through a first power system and a second power system of which an electricity rate is lower than an electricity rate of the first power system, and maintains a temperature of a target within a predetermined range. The heating system includes a heat generation unit which generates heat using the electricity supplied through the second power system. In addition, the heating system control method includes causing, when a signal is received from the power supplier, the heat generation unit to generate additional heat during a period of time from when the signal is received to when the supply of electricity through the second power system is stopped, the signal indicating that the supply of electricity through the second power system is to be stopped after an elapse of a predetermined period of time, and the additional heat being required while the supply of electricity through the second power system is being suspended.

Furthermore, the heating system may include a heat storage unit which stores the heat generated by the heat generation unit, and a heat radiation unit which radiates the heat stored in the heat storage unit.

Advantageous Effects of Invention

According to an implementation of the present invention, when a pre-shutoff signal is received from a power supplier, it is possible to shut off a supply of electricity to a heating system after storing heat required for a shutoff hour in a housing frame or a tank. This allows suppressing decrease in room temperature even in a house having poor heat insulating performance, and maintaining user comfort. In addition, it is possible to promote diffusion of the heating system across an established market, thus allowing contribution to grid power stabilization as well as contribution to efforts against global warming.

DESCRIPTION OF EMBODIMENTS

Hereinafter, embodiments of the present invention will be described with reference to the drawings. Note that the same reference sign is used for the same constituent element.

Embodiment 1

Figure 1:
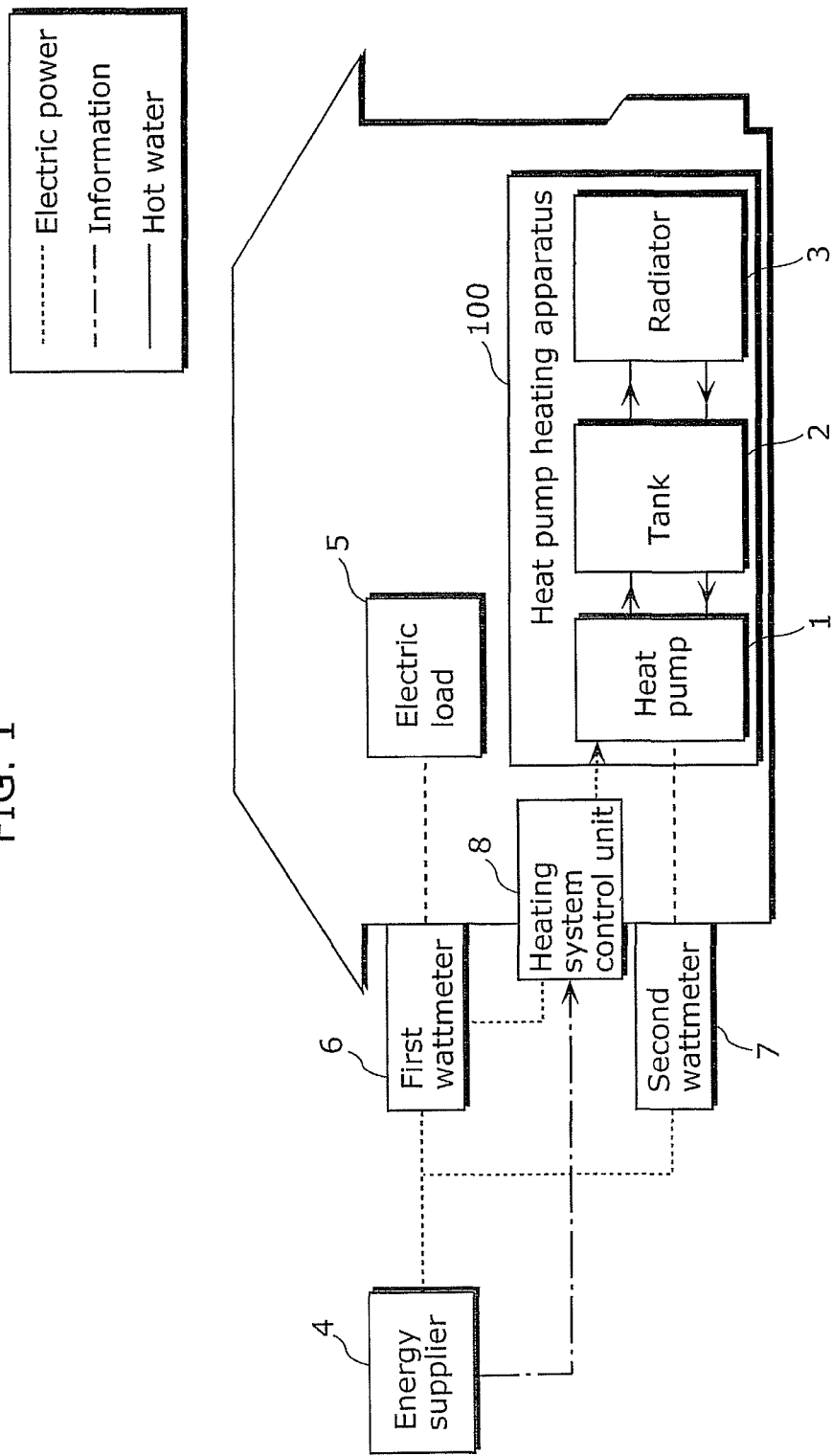
FIG. 1 is a diagram showing an outline configuration of a heat pump heating system according to a first embodiment.

FIG. 1 is a diagram showing a heat pump heating system according to a first embodiment of the present invention. In FIG. 1, electric power is supplied to a house from an energy supplier (power supplier) 4 through first and second power systems. The first power system is a power system through which the electric power is reliably supplied. In addition, the first power system is a power system which costs relatively high electricity rate, and whose electricity consumption is measured by a first wattmeter 6. On the other hand, the second power system is a power system with which the energy supplier can stop the supply of electricity during an arbitrary hour. In addition, the second power system is a power system which costs lower electricity rate than the first power system, and whose electricity consumption is measured by a second wattmeter 7.

In addition, in the house shown in FIG. 1, an electric load 5, a heating system control unit 8, and a heat pump heating apparatus 100 are provided. The heat pump heating apparatus 100 includes at least a heat pump 1, a tank 2, and a radiator 3.

The heat pump (heat generation unit) 1 is an air-source heat pump, and generates high-temperature hot water by causing heat exchange between a refrigerant (for example, R410A) and water through a condenser (not shown). The tank (heat storage unit) 2 stores the hot water generated by the heat pump 1, and is used as a buffer for supplying heat required for maintaining the room temperature at a constant level when outside air temperature rapidly falls, and so on. The radiator 3 is a device for heating an inside of the room using the hot water supplied from the tank 2. Here, the heat pump 1, the tank 2, and the radiator 3 are referred to, altogether, as the heat pump heating apparatus 100.

The first wattmeter 6 measures power consumption of the heating system control unit 8, a part of the heat pump heating apparatus 100 (as will hereinafter be described in detail), and a device other than the heat pump heating apparatus 100 (that is a heating load 5). On the other hand, the second wattmeter 7 measures, mainly of the heat pump heating apparatus 100, power consumption of a compressor, a pump used for circulating hot water between the tank 2 and the heat pump 1, and a fan and so on for promoting heat exchange in the evaporator (as will hereinafter be described in detail).

The heating system control unit 8 has a function to communicate with the energy supplier 4, and provides a control command to the heat pump heating apparatus 100. The energy supplier 4 is a company that supplies electricity or gas to each household, and notifies the household using a shutoff signal (hereinafter, referred to as a "pre-shutoff signal") in advance when it is intended to suppress the use of electricity in the household. The timing of notification by the pre-shutoff signal is, for example, two hours before the hour during which the use of electricity in the household is intended to be suppressed.

Figure 2:
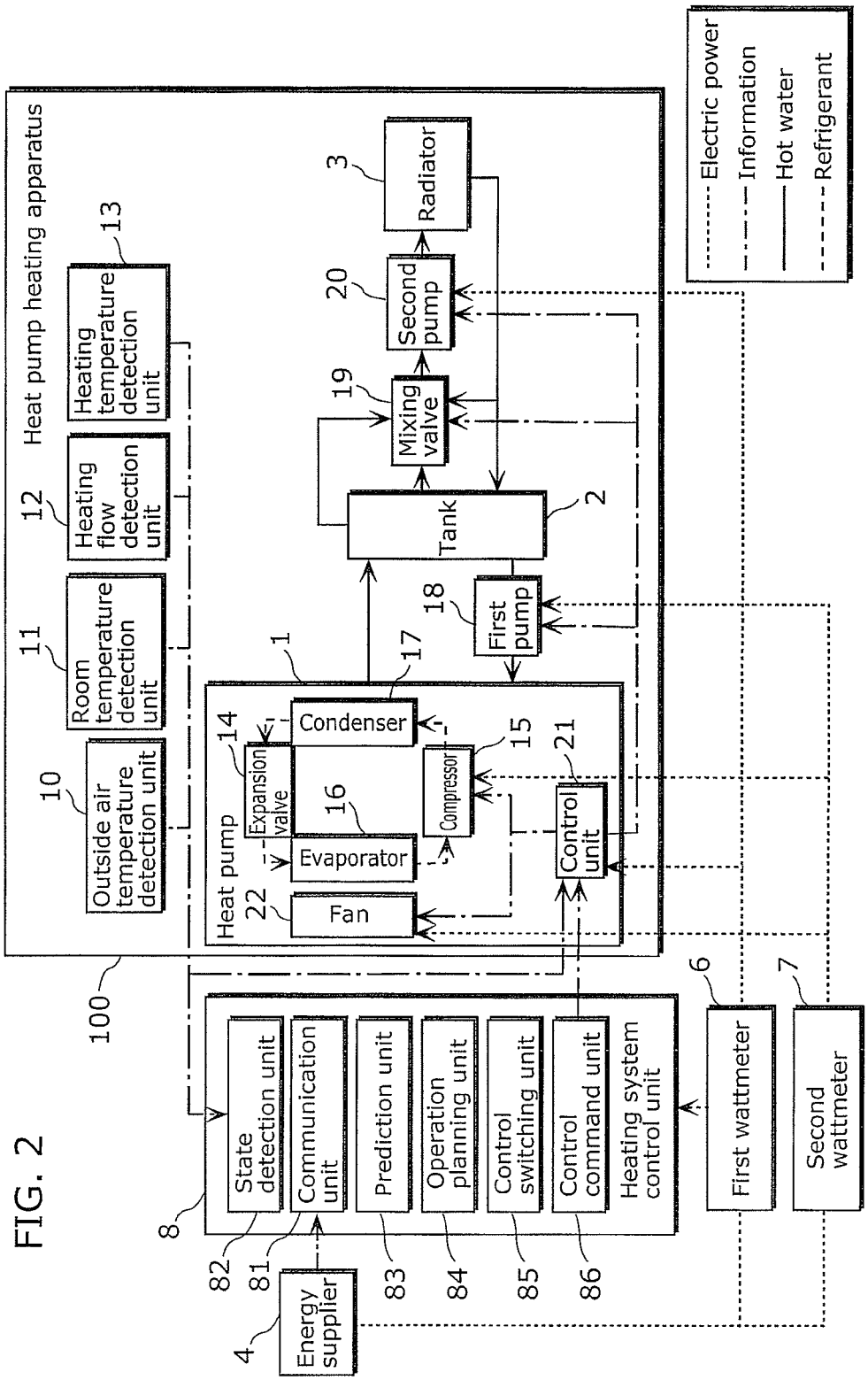
FIG. 2 is a diagram showing a detailed configuration of the heat pump heating system according to the first embodiment.

FIG. 2 is a detailed configuration diagram of the heat pump heating apparatus 100 and the heating system control unit 8 according to the first embodiment of the present invention. The heat pump 1 includes: a heat pump cycle which includes an evaporator 16 that generates a low-temperature low-pressure vapor refrigerant by causing heat exchange between outside air and a low-temperature low-pressure liquid refrigerant, a compressor 15 that is driven by a motor and compresses a low-temperature low-pressure vapor refrigerant into a high-temperature high-pressure vapor refrigerant, a condenser 17 that generates a low-temperature high-pressure liquid refrigerant by causing heat exchange between the high-temperature high-pressure vapor refrigerant and water (heat storage material) circulated from the tank 2, and an expansion valve 14 that generates a low-temperature low-pressure liquid refrigerant by decreasing the pressure of the low-temperature high-pressure vapor refrigerant; a control unit 21 which controls the compressor 15 and the first pump 18 such that the heat storage amount in the tank 2 is larger than or equal to a predetermined amount of heat storage, determines the mixture ratio in the mixing valve 19 such that hot water of a predetermined temperature circulates into the radiator 3, and adjusts the flow amount of the second pump 20; and a fan 22 which promotes heat exchange between the refrigerant in the evaporator and the outside air.

The tank 2 holds the hot water generated by the heat pump 1. The heat pump 1 and the tank 2 are connected by hot water piping. The first pump 18 circulates hot water, sending low-temperature hot water from a lower portion of the tank 2 into the heat pump 1, which causes heat exchange in the condenser 17 to turn the low-temperature hot water into high-temperature hot water (for example, 50° C.), and the hot water is subsequently returned to an upper or middle portion of the tank 2. The hot water, once pooled in the tank 2, is circulated, by a second pump 20, into the radiator 3 provided in each room of the house.

The hot water circulated in the radiator 3 warms the room by radiating heat energy into the room via a heat radiation panel. At this time, the mixing valve 19 mixes, at a predetermined mixture ratio according to the control by the control unit 21, high-temperature hot water in the upper portion of the tank 2, relatively medium-temperature hot water in the middle, low-temperature hot water returning from the radiator 3, and so on such that the radiation temperature of the radiator 3 becomes a predetermined heating temperature.

The control unit 21 controls the amount of heat radiated by the radiator 3 so as to maintain the room temperature in the room provided with the radiator within a predetermined range, and also controls the amount of heat generated by the heat pump 1. More specifically, when obtaining the pre-shutoff signal from the energy supplier 4, the control unit 21 causes the heat pump 1 to generate additional heat that is required while the supply of electricity through the second power system is being suspended, during a period of time from when the pre-shutoff signal is received to when the supply of electricity through the second power system is stopped.

An outside air temperature detection unit 10 is mainly provided outside the room and detects the outside air temperature using a thermostat. A room temperature detection unit 11 is mainly provided in the room, and detects the room temperature using a thermostat. A heating flow detection unit 12 is a flow sensor provided in each pipe in the heat pump heating apparatus 100, and detects amounts of hot water flow circulated by the first pump 18 and the second pump 20. A heating temperature detection unit 13 is a thermostat provided in each pipe in the tank 2 and the heat pump heating apparatus 100, and detects the temperature of each of the upper, middle, and lower portions of the tank 2, the temperature of the hot water flowing from the mixing valve 19 toward the radiator 3, the temperature of the hot water returning from the radiator 3 to the tank 2, the temperature of the hot water flowing from the heat pump 1 toward the tank 2, and the temperature of the hot water returning from the tank 2 to the heat pump 1.

A heating system control unit 8 includes: a communication unit 81, a state detection unit 82, a prediction unit 83, an operation planning unit 84, a control switching unit 85, and a control command unit 86. Note that in the first embodiment, the heating system control unit 8 is configured as a separate body from the heat pump heating apparatus 100.

The communication unit 81 has such a function as to receive a pre-shutoff signal and an ON signal from the energy supplier 4, and notify the energy supplier 4 that the supply of electricity to the heat pump heating apparatus 100 through the second power system has been shut off or resumed.

The pre-shutoff signal received by the communication unit 81 is a signal indicating that the supply of electricity through the second power system is to be stopped after an elapse of a predetermined period of time. This pre-shutoff signal includes at least information to specify a "shutoff hour" that is an hour during which the supply of electricity through the second power system is stopped. The method of specifying the shutoff hour is not particularly limited, but may be specified by a start time and an end time of the shutoff, or may be specified such as for a y-hour (shutoff hour) since an x-time (shutoff start time).

The state detection unit 82 detects various states, such as the amount of the heat stored in the heat pump heating apparatus 100, the amount of heat radiated by the radiator 3 into each room, and so on according to various signals detected by the outside air temperature detection unit 10, the room temperature detection unit 11, the heating flow detection unit 12, and the heating temperature detection unit 13.

The prediction unit 83 has an algorithm for predicting the amount of heat required for the heating during the shutoff hour (hereinafter, referred to as a "heating load"), based on the information detected by the state detection unit 82, such as the outside air temperature, the room temperature, the heating temperature, and the heating flow amount. The prediction unit 83 may store information accumulated in the past, onto a recording medium such as a memory for higher prediction accuracy. The information for improving prediction accuracy includes, for example, a relational expression between the outside air temperature in the past and the heating load during the hour at the time.

When the communication unit 81 receives the pre-shutoff signal from the energy supplier 4, the operation planning unit 84 generates an operation plan for the compressor 15, the first pump 18, the fan 22, the mixing valve 19, and the second pump 20, and so on for efficiently generating the heating load predicted by the prediction unit 83 as the heating load required for the shutoff hour.

When the communication unit 81 does not receive the pre-shutoff signal from the energy supplier 4, the control switching unit 85 gives priority to the control of the compressor 15, the first pump 18, the fan 22, the mixing valve 19, and the second pump 20 (as will hereinafter be described) by the control unit 21 of the heat pump heating apparatus 100. On the other hand, when the pre-shutoff signal is received, the control switching unit 85 causes the control unit 21 to control each of the constituent elements described above in accordance with the operation plan generated by the operation planning unit 84 and notified from the control command unit 86. The control command unit 86 transmits the operation plan generated by the operation planning unit 84, to the control unit 21 of the heat pump heating apparatus 100.

Of the heat pump heating apparatus 100 configured as above, supplied with electricity from the energy supplier 4 through the second power system is mainly a portion having a function to generate heat using the heat pump 1 and circulate the hot water into the tank 2, such as the compressor 15, the first pump 18, the fan 22, and so on. Then, each of these constituent elements stops the use of electricity during the shutoff hour requested by the energy supplier 4. Here, the use of electricity for the compressor 15, the first pump 18, and the fan 22 is stopped; however, of these, only the use of electricity of the compressor 15 may be stopped because the compressor 15 consumes the largest amount of power.

On the other hand, a path from the tank 2 to the radiator 3 via the mixing valve 19 and the second pump 20, that is, a path that contributes to maintaining the temperature of each room needs to supply heat to the radiator 3 during the shutoff our, and is therefore supplied with electricity through the first power system.

The heating system control unit 8 and the control unit 21 are supplied with electricity from the energy supplier 4 through the first power system. Thus, even during the shutoff hour, the heating system control unit 8 is able to continue communication with the energy supplier 4. In addition, the control unit 21 may also control the mixing valve 19 or the second pump 20 during the shutoff hour.

Figure 3:
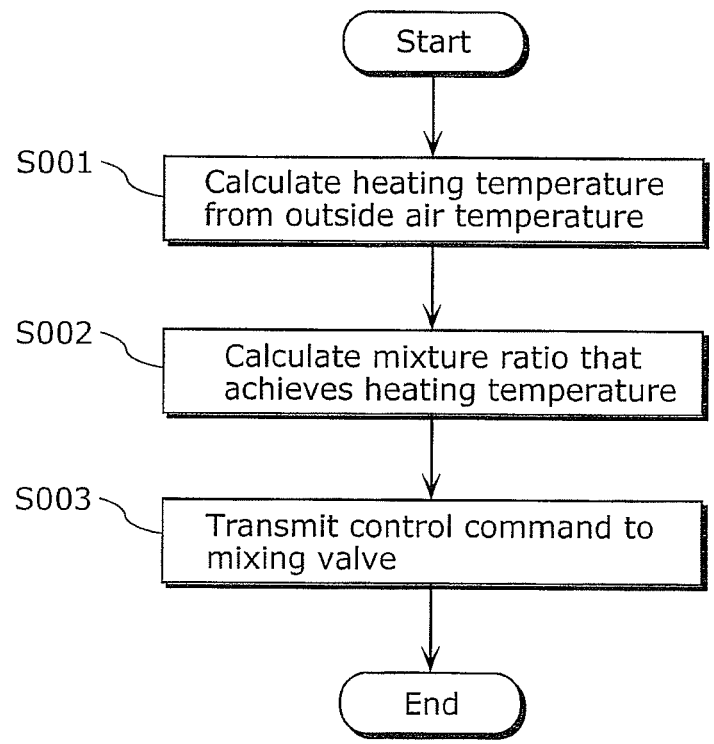
FIG. 3 is a flowchart showing an operation of a mixing valve according to the first embodiment.

FIG. 3 is a flowchart showing control performed, on the mixing valve 19 for supplying hot water of a predetermined temperature from the tank 2 to the radiator 3, by the control unit 21 of the heat pump heating apparatus 100 according to the first embodiment of the present invention.

The control unit 21 determines a target heating temperature, based on the outside air temperature detected by the outside air temperature detection unit 10 and a relational expression that is held in advance and represents a relationship between the outdoor temperature and the target heating temperature (S001). The relational expression that represents the relationship between the outside air temperature and the target heating temperature is specified by, for example, Deutsche Industrie Normen (DIN) 4702-8.

Next, the control unit 21 determines the mixture ratio of hot water such that the hot water has the determined temperature, based on the temperature of the hot water in each of the upper, middle, and lower portions of the tank which is detected by the heating temperature detection unit 13, and the temperature of the hot water returning from the radiator 3 to the tank 2 (S002), and so on, and controls the mixing valve 19 to generate hot water at the mixture ratio (S003). In this case, the amount of the flow in the second pump 20 may be constant, or the control unit 21 may control the amount of flow based on the room temperature detected by the room temperature detection unit 11 and the like. Note that the control unit 21 is continuously supplied with electricity even during the shutoff hour, and therefore the control does not depend on whether it is during the shutoff hour or not.

Figure 4A:
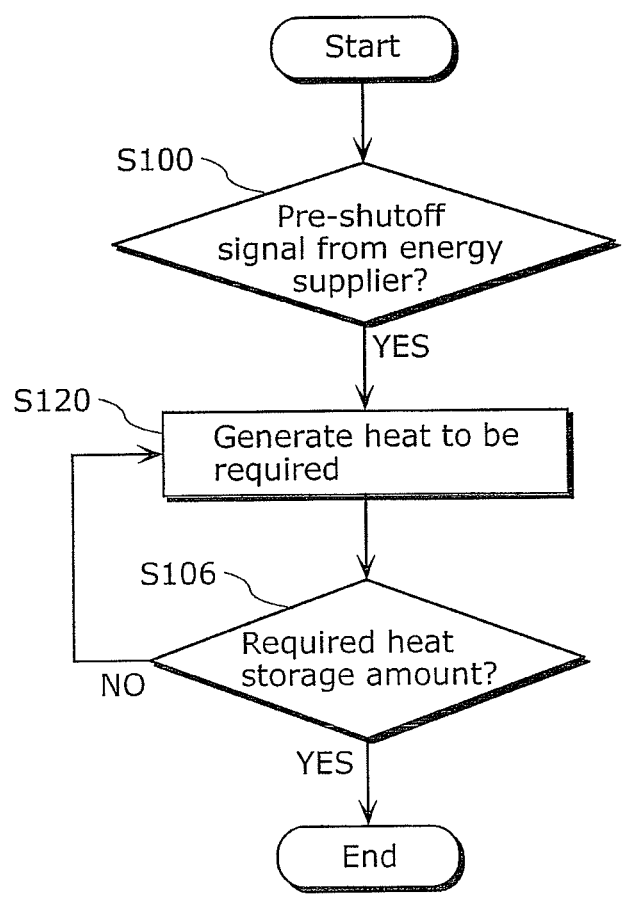
FIG. 4A is a flowchart showing an outline of an operation of a heating system control unit and a control unit according to the first embodiment.
Figure 4B:
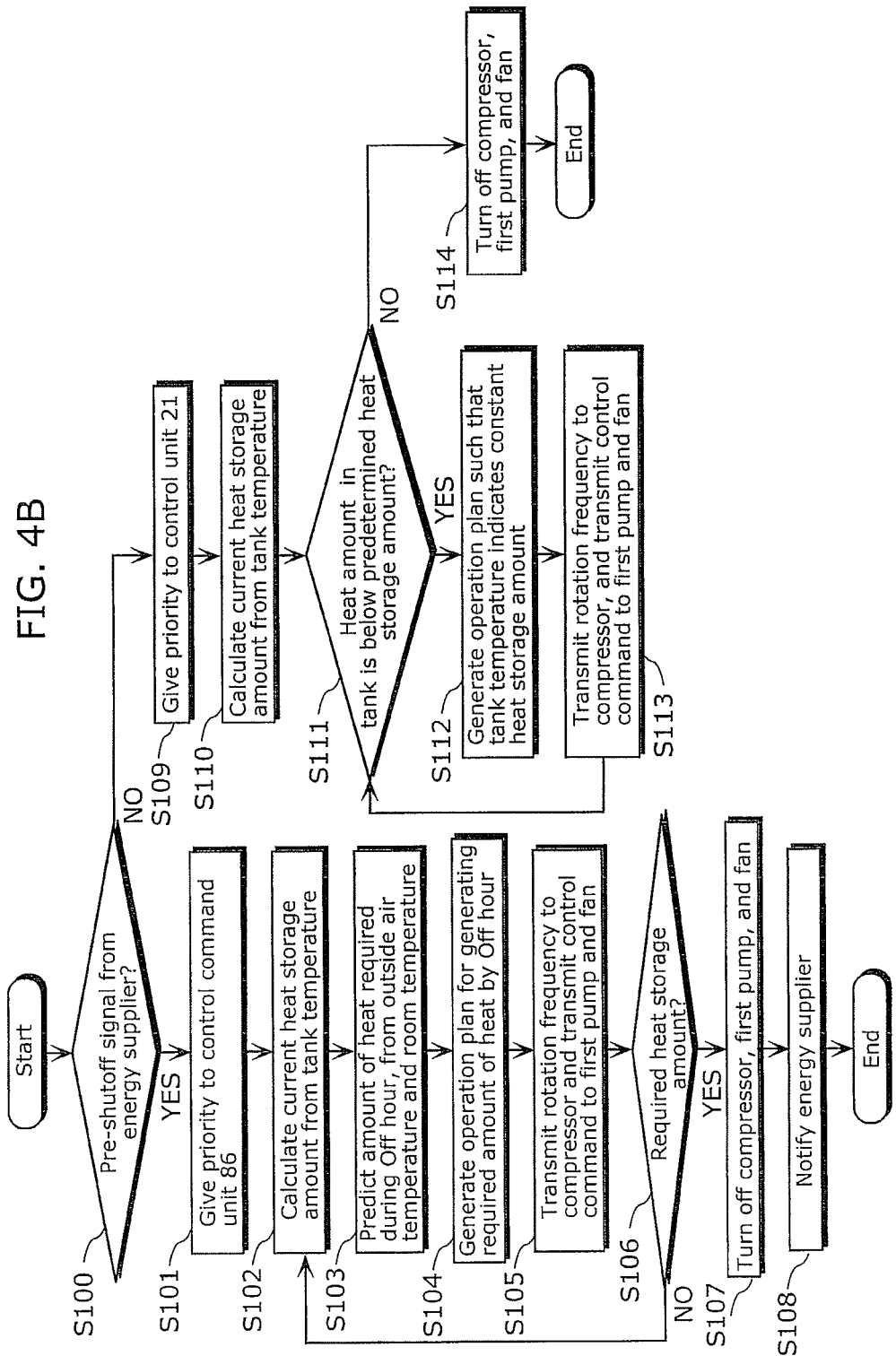
FIG. 4B is a flowchart showing details of an operation of the heating system control unit according to the first embodiment.

FIG. 4A and FIG. 4B each show a flowchart mainly illustrating the control that is performed, after the pre-shutoff signal is received, by the heating system control unit 8 and the control unit 21 according to the first embodiment of the present invention. First, an outline of the processing is described with reference to the flowchart shown in FIG. 4A, and after this, details of the processing are described with reference to the flowchart shown in FIG. 4B.

As shown in FIG. 4A, when the pre-shutoff signal is received from the energy supplier (S100: Yes), the heating system control unit 8 and the control unit 21 control the heat pump 1 such that the heat pump 1 generates the required heat (S120).

Next, the heating system control unit 8 determines whether or not the required heat storage amount is reached (S106).

Then, when the required amount of heat storage is not reached yet (S106: NO), the processing returns to the step in S120, to continue the heat generation. On the other hand, when the required storage amount is reached (S106:YES), the heat storage by preliminary heat generation is finished.

Next, the processing shown in FIG. 4A (particularly, step S120) are described in detail with reference to FIG. 4B. The control switching unit 85 determines whether or not the communication unit 81 has received the pre-shutoff signal from the energy supplier 4 (S100), and gives priority to the control command from the control unit 21 (S109) when the pre-shutoff signal is not received (S100: NO).

Here, the control command from the control unit 21 is intended for storing, in the tank 2, a predetermined amount of heat required for heating (that is, a heat amount that exceeds the amount of heat radiation from the radiator 3). For example, by detecting the temperature of each of the upper, the middle, the lower portions of the tank 2, it is possible to determine whether or not the predetermined amount of required heat is stored because the capacity of the tank 2 is known (for example, 200 L).

In other words, the control unit 21 first calculates the amount of the heat stored in the tank 2, based on the temperature of each of the upper, the middle, the lower portions of the tank 2 that has been detected by the heating temperature detection unit 13 (S110). Then, the control unit 21 determines whether or not the heat amount in the tank 2 is below a predetermined value (S111). When the heat amount in the tank 2 is below the predetermined value (S111: YES), the control unit 21 sets a rotation frequency of the compressor 15, a flow amount of the first pump 18, a rotation frequency of the fan 22, and so on (S112) and transmits a control command to each of the portions (S113), so as to generate an amount of heat that covers a shortfall such that the amount of heat more than or equal to a predetermined heat amount is stored. On the other hand, when the amount of the generated heat is more than or equal to the predetermined value (S111: NO), the control unit 21 determines that further heat storage is not necessary, and stops the operations of the compressor 15, the first pump 18, and the fan 22 (S114).

On the other hand, when the communication unit 81 receives the pre-shutoff signal from the energy supplier 4 (S100: YES), the control switching unit 85 gives priority to the control command from the control command unit 86 (S101). The control command is issued from the control command unit 86, based on the operation plan for storing the amount of heat required for the shutoff hour, which has been set by the operation planning unit 84. This stored heat (the heat required for the shutoff hour) is radiated from the radiation unit such as the radiator 3.

In other words, the state detection unit 82 calculates the amount of the heat stored in the tank 2, based on the temperature of each of the upper, the middle, the lower portions of the tank 2 that has been detected by the heating temperature detection unit 13 (S102). Next, the prediction unit 83 predicts the heating load required for the shutoff hour, based on the results obtained by the outside air temperature detection unit 10 and the room temperature detection unit 11 (S103).

Next, the operation planning unit 84 generates an operation plan for causing the heat pump 1 to generate, by the time the shutoff starts (for example, 2 hours later), an amount of heat equivalent to the difference between the amount of heat currently stored in the tank 2 and the heating load required for the shutoff hour (S104). In other words, the amount of heat generated in S104 is equivalent to the amount of heat calculated by adding the amount of heat equivalent to the difference to the amount of heat required for maintaining the room temperature at the set temperature. In addition, as an operation planning method, for example, it is preferable to cause the heat pump 1 to operate when the coefficient of performance (COP) of the heat pump 1 is in a highest possible state. For example, it is preferable to operate the compressor 15 and the fan 22 when the outside air temperature is high.

The control command unit 86 notifies the control unit 21 to control the compressor 15, the first pump 18, and the fan 22 according to the operation plan thus obtained (S105). The control unit 21 controls the heat pump 1 according to the operation plan obtained from the control command unit 86 so that the heat equivalent to the amount of heat radiation predicted by the prediction unit 83 is stored in the tank 2.

The above processing is repeated until the required amount of heat for the tank 2 is stored (S106: NO), and when the required amount is reached (S106: YES), the supply of electricity to the compressor 15, the first pump 18, and the fan 22 is suspended (S107), and the energy supplier 4 is notified of the suspension (S108).

Figure 5A:
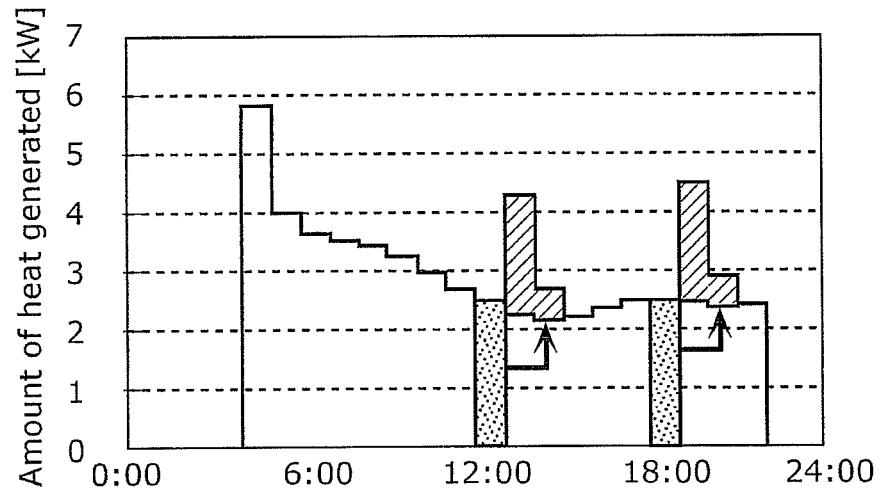
FIG. 5A is a diagram showing an example of an amount of heat generated during a shutoff hour according to a comparative example.
Figure 5B:
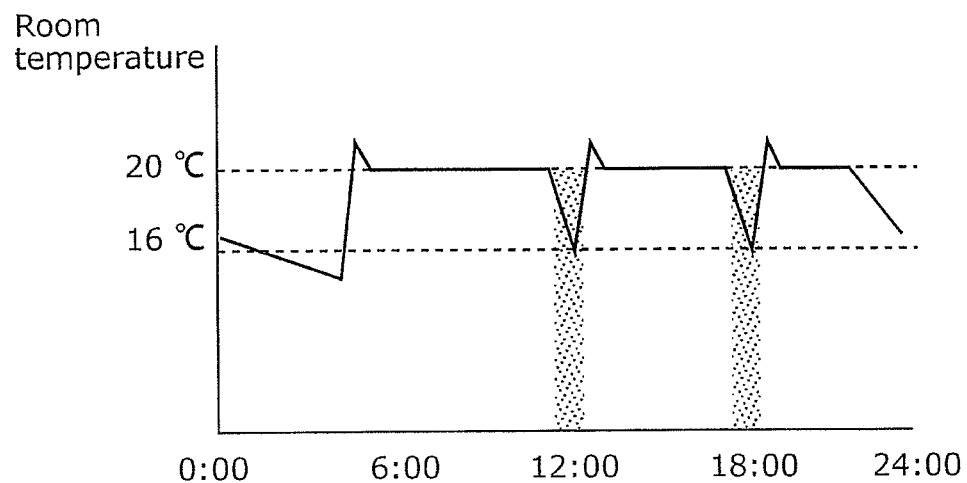
FIG. 5B is a diagram showing an example of change in room temperature during the shutoff hour according to the comparative example.

FIGS. 5A and 5B show a daily transition of an amount of heat generated by the heat pump heating system that is a comparative example (FIG. 5A) and change in room temperature (FIG. 5B). In addition, FIGS. 6A and 6B show a daily transition of an amount of heat generated by the heat pump heating apparatus 100 according to the first embodiment of the present invention (FIG. 6A) and change in room temperature (FIG. 6B).

Figure 6A:
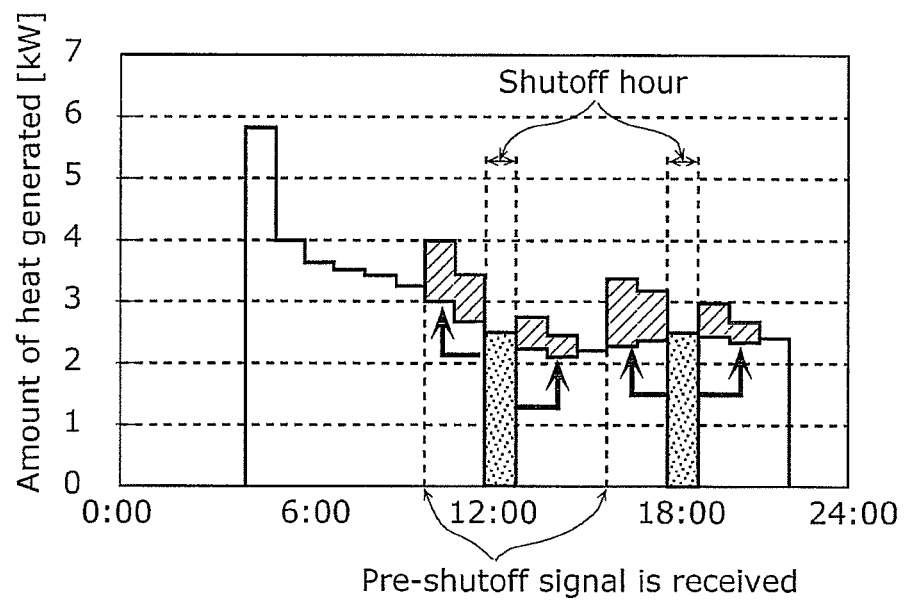
FIG. 6A is a diagram showing an example of an amount of heat generated during the shutoff hour according to the first embodiment.

FIG. 5A and FIG. 6A show, respectively, a temporal change in the amount of heat generated by the heat pump heating system that is the comparative example and a temporal change in the amount of heat generated by the heat pump heating apparatus 100 according to the first embodiment of the present invention. Here, the shutoff hour is assumed to be carried out two times a day, for one hour each time, from 12:00 to 13:00 and 18:00 to 19:00. In addition, as shown in FIG. 6A, the pre-shutoff signal is received at 10:00 and 16:00.

Figure 6B:
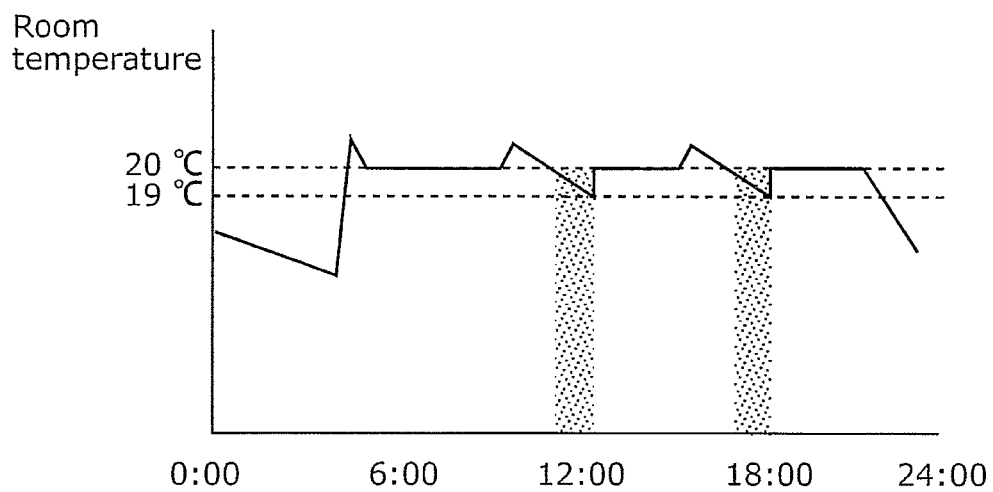
FIG. 6B is a diagram showing an example of change in room temperature during the shutoff hour according to the first embodiment.

In addition, FIGS. 5B and 6B show, respectively, change in room temperature of a house provided with the heat pump heating system that is the comparative example and change in room temperature of a house provided with the heat pump heating apparatus 100 according to the first embodiment of the present invention, where the temperature (heating temperature) is set to 20° C. Note that in each of the cases, an average COP per day of the heat pump is approximately 2.3, so that an amount of the actual power consumption is calculated by dividing, by the COP, the heat amount along the vertical axis shown in FIGS. 5A and 6A.

In the case of the heat pump heating system as the comparative example, since the shutoff hour is not notified in advance, the heat pump heating system is turned off without sufficient storage of heat in the tank or in the housing frame. In other words, as shown in FIG. 5A, the amount of heat required for the shutoff hour (a dotted area in FIG. 5A) is generated after the shutoff hour is over (a shaded area in FIG. 5A).

This, as shown in FIG. 5B, causes increase in the difference between the room temperature during the shutoff hour and the set temperature 20° C., and may possibly affect user comfort. Particularly, in the case of a house having poor heat insulating performance, the room temperature significantly falls during the shutoff hour.

With the heat pump heating apparatus 100 according to the first embodiment of the present invention, it is possible to set the room temperature higher by the time the shutoff hour starts or to store the required amount of heat in the tank 2. In other words, as shown in FIG. 6A, most of the amount of heat required for the shutoff hour (a dotted area in FIG. 6A) is generated before the shutoff hour starts (a shaded area in FIG. 6A). Thus, the heat pump heating apparatus 100 generates heat by generating the heat required for the shutoff hour in addition to the heat required for maintaining the room temperature at approximately 20° C., before the shutoff hour starts.

Since the tank 2 of the heat pump heating apparatus 100 has a limited capacity for hot water, it is not possible, in some cases, to generate all the amount of heat required for the shutoff hour in advance. If this is the case, as shown in FIG. 6A, when the heat pump heating apparatus 100 starts operating (at 13:00 and 19:00) after the shutoff hour, the heat pump heating apparatus 100 is controlled such that extra heat is generated in addition to the amount of heat required for maintaining the set room temperature (20° C.).

This, as shown in FIG. 6B, decreases the difference between the room temperature after the shutoff hour and the set temperature 20° C. This achieves contribution to system power stabilization without compromising user comfort, thus allowing the user to enjoy the lower electricity rate. In this case, the amount of shutoff power which has contributed to system power stabilization is approximately 1.3 kW (5.72 kWh/(COP 2.2×2 hours).

As described above, with the heat pump heating apparatus 100 and the heating system control unit 8 according to the first embodiment of the present invention, in response to a prior notice from the energy supplier 4 for specifying the shutoff hour, it is possible to predict the heating load required for the heating during the shutoff hour and generate an amount of heat that covers a shortfall within a predetermined period of time. This contributes to system standardization without compromising user comfort, thus allowing the user to enjoy the lower electricity rate. Accordingly, this contributes not only to the market of the heat pump heating system for new houses having high housing performance but also to introducing a heat pump heating system compatible with the shutoff for the lower electricity rate for replacing the existing heating system having poor housing performance.

Note that the heat pump 1 according to the first embodiment of the present invention has been described as an air-source heat pump 1, but may be a geothermal heat pump or a water-source heat pump. In this case, during the shutoff hour, it is possible to stop, instead of the fan 22, an operation of brine on a heat source side or a water circulation pump during the shutoff hour.

In addition, a specific example of the heat pump heating system according to the first embodiment of the present invention has been described as an air conditioning system which maintains the temperature of the room in which the radiator 3 is provided within a predetermined range (around 20° C.); however, the heat pump heating system according to the first embodiment of the present invention is not limited to this, and is also applicable as a floor heating system which maintains floor temperature within a predetermined range or a hot-water supply system which maintains water temperature within a predetermined range.

In addition, in the first embodiment of the present invention, the heating system control unit 8 has been described as communicating with the energy supplier 4, but the destination of the communication is not limited to the energy supplier. For example, in the case where a certain company provides electricity-leveling services to the energy supplier, the heating system control unit 8 is to communicate with the company.

In addition, in the first embodiment of the present invention, the communication unit 81 has been described as notifying the energy supplier 4 when the supply of electricity to the compressor 15, the first pump 18, and the fan 22 is suspended, but such notification is not essential.

The communication rules with the energy supplier 4 are not particularly limited, and it is only necessary to realize the following two points: (1) receiving, from the energy supplier 4, a prior notice signal intended for reducing the amount of electricity use, and (2) suspending use of electricity after storing the required amount of heat by controlling, triggered by the prior notice signal, the heat pump heating apparatus 100.

In addition, in the first embodiment of the present invention, there is no particular limitation on: a communication unit for communication between the energy supplier 4 and the heating system control unit 8; a communication unit for communication between the heating system control unit 8 and the control unit 21; and a communication unit for communication between the control unit 21, the compressor 15, the first pump 18, the fan 22, the mixing valve 19, and the second pump 20.

In addition, the heating system control unit 8 according to the first embodiment of the present invention has been described as predicting the amount of heat required for the heating during the shutoff hour, but need not have a prediction function. In other words, the heating system control unit 8, when receiving the notification for specifying the shutoff hour, may transmit, to the control unit 21, the control command for generating the maximum amount of heat that can be stored in the tank 2 (for example, 11.6 kW in the case of storing hot water of 50° C. in a hot water tank of 200 L). In this case, however, due to increase in heat loss by radiation, storing more heat than is required results in increase in energy consumption, which causes increase in electricity rate.

In addition, the heating system control unit 8 according to the first embodiment is not integrated with the heat pump heating apparatus 100. By separately providing the heating system control unit 8, it is possible to perform control for suspending the use of electricity during the shutoff hour (that is, peak-shift control), on an apparatus other than the heat pump heating apparatus 100 (for example, a dryer, a washing machine, a dishwasher, and so on).

Embodiment 2

Cascade-Type HP

Embodiment 2

Heat Pump (HP) of Cascade Type

In the second embodiment, a portion different from the first embodiment 1 is mainly described.

Figure 7:
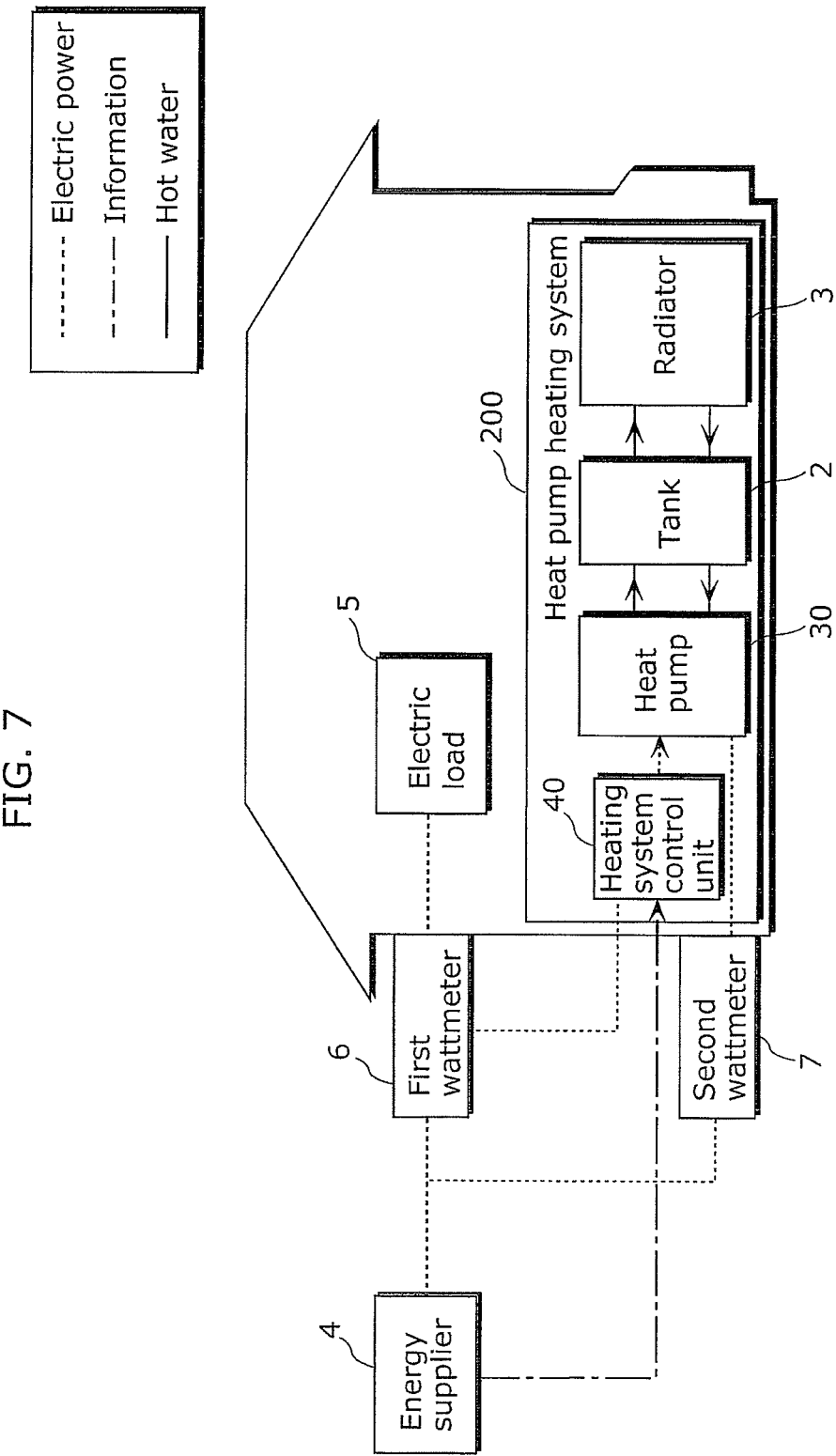
FIG. 7 is a diagram showing an outline configuration of a heat pump heating system according to a second embodiment.

FIG. 7 is a diagram showing a heat pump heating system 200 according to a second embodiment of the present invention. The heat pump heating system 200 shown in FIG. 7 is different from the heat pump heating system shown in FIG. 1 in that a heating system control unit 40, a heat pump 30, a tank 20, and a radiator 3 are integrally configured into the heat pump heating system 200.

The heat pump 30 is an air-source heat pump, and generates high-temperature hot water by causing heat exchange between a refrigerant (for example, R410A) and water through a condenser (not shown). The tank 2 stores the hot water generated by the heat pump 30, and is used as a buffer for supplying heat required for maintaining the room temperature at a constant level when the outside air temperature rapidly falls, and so on. The radiator 3 is a device for heating an inside of the room using the hot water supplied from the tank 2. The heating system control unit 40 communicates with the energy supplier 4, controls the heat pump 30, and so on, in response to the supply of electricity through the first power system. Here, the heat pump heating system 200 is mainly configured with: the heating system control unit 40, the heat pump 30, the tank 2, and the radiator 3.

The first wattmeter 6 measures power consumption of a part of the heat pump heating system 200 and a device other than the heat pump heating system 200 (the electric load 5). On the other hand, the second wattmeter 7 measures, mainly of the heat pump heating apparatus 200, power consumption of a compressor, a pump used for circulating hot water between the tank 2 and the heat pump 1, and a fan and so on for promoting heat exchange in the evaporator (as will hereinafter be described in detail).

The energy supplier 4 is a company that supplies power and gas to each household, and notifies the household using a shutoff signal in advance (hereinafter, referred to as a "pre-shutoff signal"), when it is intended to suppress the use of electricity in the household. The notification of the pre-shutoff signal is performed, for example, two hours before the hour during which the use of electricity in the household is intended to be suppressed.

Figure 8:
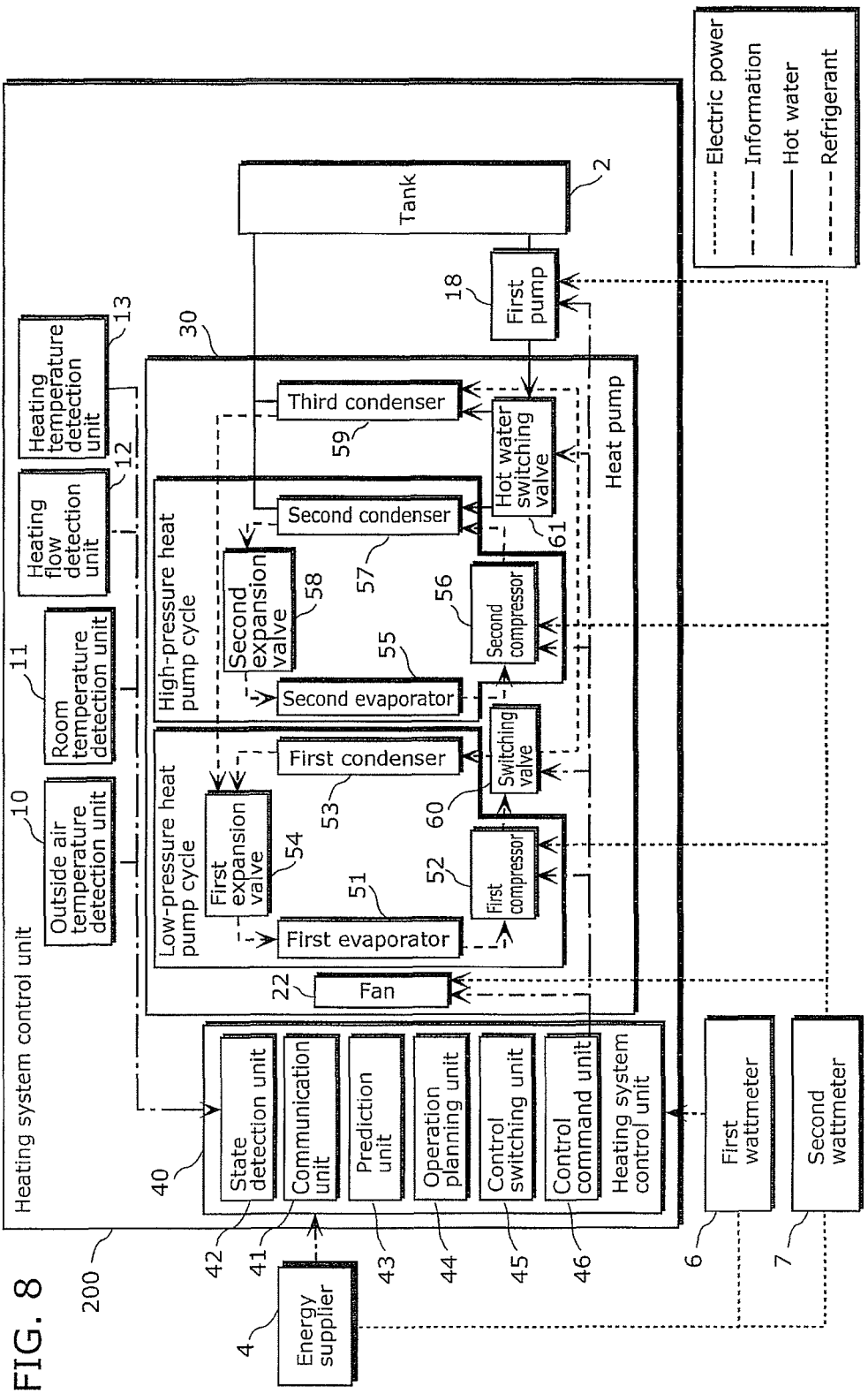
FIG. 8 is a diagram showing a detailed configuration of the heat pump heating system according to the second embodiment.

FIG. 8 is a diagram showing a detailed configuration of the heat pump heating system 200 according to the second embodiment of the present invention. Note that the mixing valve 19, the second pump 20, and the radiator 3 have the same configurations as those in FIG. 2, and therefore the illustrations thereof are omitted.

The heat pump 30 has two cycles: a low-pressure heat pump cycle and a high-pressure heat pump cycle. These two heat pump cycles are connected by what is called cascade connection.

The low-pressure heat pump cycle includes: a first evaporator 51 which generates a low-temperature low-pressure vapor refrigerant by causing heat exchange between outside air and a low-temperature low-pressure liquid refrigerant (for example, R410A); a first compressor 52 which is driven by a motor and compresses the low-temperature low-pressure vapor refrigerant into a high-temperature high-pressure vapor refrigerant; a first condenser which generates a low-temperature high-pressure vapor refrigerant by causing heat exchange between the high-temperature high-pressure vapor refrigerant and a refrigerant of the high-pressure heat pump cycle (for example, R134a); and a first expansion valve 54 which generates a low-temperature low-pressure liquid refrigerant by decreasing the pressure of the low-temperature high-pressure vapor refrigerant. In addition, a fan 22 is attached, to promote heat exchange between the refrigerant in the first evaporator and the outside air.

In addition, the high-pressure heat pump cycle includes: a second evaporator 55 which generates a low-temperature low-pressure vapor refrigerant by causing heat exchange between a refrigerant of the low-pressure heat pump cycle and the low-temperature low-pressure liquid refrigerant; a second compressor 56 which is driven by a motor and compresses the low-temperature low-pressure vapor refrigerant into a high-temperature high-pressure vapor refrigerant; a second condenser 57 which generates a low-temperature high-pressure vapor refrigerant by causing heat exchange between the high-temperature high-pressure vapor refrigerant and water (heat storage material); and a second expansion valve 58 which generates a low-temperature low-pressure liquid refrigerant by decreasing pressure in the low-temperature high-pressure vapor refrigerant.

A selector valve 60 is a valve for switching so as to circulate the high-temperature high-pressure vapor refrigerant generated by the first compressor 52, either into the first condenser 53 for heat exchange between the high-temperature high-pressure vapor refrigerant and the liquid refrigerant flowing in the second evaporator 55, or into a third condenser 59 for heat exchange between the vapor refrigerant and hot water flowing in the third condenser 59.

The hot water selector valve 61 switches to direct the hot water circulated from the first pump 18, either toward the third condenser 59 so as to obtain hot water of a relatively low temperature for heating (for example, 50° C.) or toward the second condenser 57 so as to obtain hot water of a high temperature for storing heat (for example, 70° C.), and operates in conjunction with the selector valve 60.

In other words, when the selector valve 60 circulates the vapor refrigerant into the third condenser 59, the hot water selector valve 61 circulates the hot water into the third condenser 59. This allows obtaining hot water of approximately 50° C. for use for normal heating (hereinafter referred to as "heating operation") from the third condenser 59, using only the low-pressure heat pump cycle (a first state). On the other hand, when the selector valve 60 circulates the vapor refrigerant into the first condenser 53, the hot water selector valve 61 circulates the hot water into the second condenser 57. This allows obtaining, from the second condenser 57, hot water of approximately 70° C. for storing the heat required during the shutoff hour, using the low-pressure heat pump cycle and the high-pressure heat pump cycle (a second state). Then, the selector valve 60 and the hot water selector valve 61 described above operate as a switching unit which switches between the first state and the second state, in accordance with the control by the heating system control unit 40.

The tank 2 stores the hot water generated by the heat pump 30. The heat pump 30 and the tank 2 are connected by hot water piping. The first heat pump 18 circulates hot water, sending the low-temperature hot water from a lower portion of the tank 2 into the heat pump 30, which causes heat exchange in the second condenser 57 or the third condenser 59, and the hot water is subsequently returned to an upper or middle portion of the tank 2. The hot water, once pooled in the tank 2, is circulated to each room in the house. A path from the tank 2 to each room and a control of the path are the same as those of the first embodiment, and therefore the description thereof is omitted.

The heating system control unit 40 is a portion which controls the heat pump 30 and includes: a communication unit 41, a state detection unit 42, a prediction unit 43, an operation planning unit 44, a control switching unit 45, a control command unit 46, and so on.

The communication unit 41 has such a function as to receive a pre-shutoff signal or an ON signal from the energy supplier 4, and notify the energy supplier 4 that the supply of electricity to the heat pump heating apparatus 200 through the second power system has been shut off or resumed.

The state detection unit 42 detects various states such as the amount of the heat stored in the heat pump heating apparatus 200, from various signals detected by an outside air temperature detection unit 10, a room temperature detection unit 11, a heating flow detection unit 12, and a heating temperature detection unit 13.

The prediction unit 43 has an algorithm for predicting the heating load required for the heating during the shutoff hour, based on the information detected by the state detection unit 42, such as the outdoor temperature, the room temperature, the heating temperature, and the heating flow amount.

When the communication unit 41 receives the pre-shutoff signal from the energy supplier 4, the operation planning unit 44 generates an operation plan for the first compressor 52, the second compressor 56, the first pump 18, the fan 22, and so on for efficiently generating a heating load predicted by the prediction unit 83 as the heating load required for the shutoff hour (hereinafter, referred to as a "heat storing operation").

The control switching unit 45 gives priority to the heating operation when the communication unit 41 does not receive the pre-shutoff signal from the energy supplier 4, and switches the priority in the control such that the heat storing operation has priority when the communication unit 41 receives the pre-shutoff signal. The control command unit 46 is a portion that controls the first compressor 52, the second compressor 56, the first pump 18, the fan 22, and so on, based on the operation plan generated by the operation planning unit 44.

Of the heat pump heating system 200, supplied with electricity from the energy supplier 4 through the second power system is a portion having a function to generate heat by circulating hot water into the tank 2 using the heat pump 30, such as the first compressor 52, the second compressor 56, the first pump 18, the fan 22, and so on, and the portion stops the use of electricity during the shutoff hour requested by the energy supplier 4.

The heating system control unit 40 is supplied with electricity from the energy supplier 4 through the first power system. This allows continuing communication with the energy supplier 4 even during the shutoff hour.

Figure 9A:
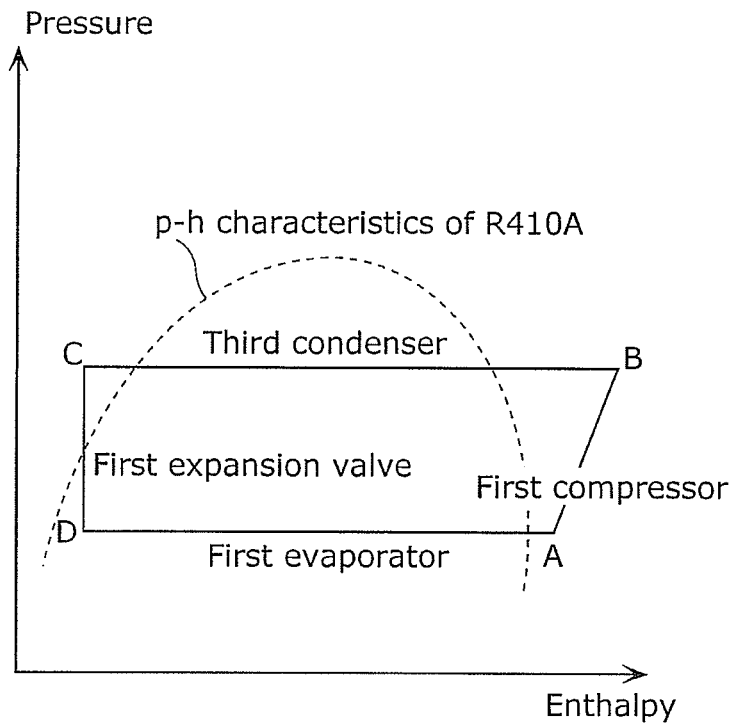
FIG. 9A is a p-h line diagram in the case of using only a low-pressure heat pump cycle in the second embodiment.
Figure 9B:
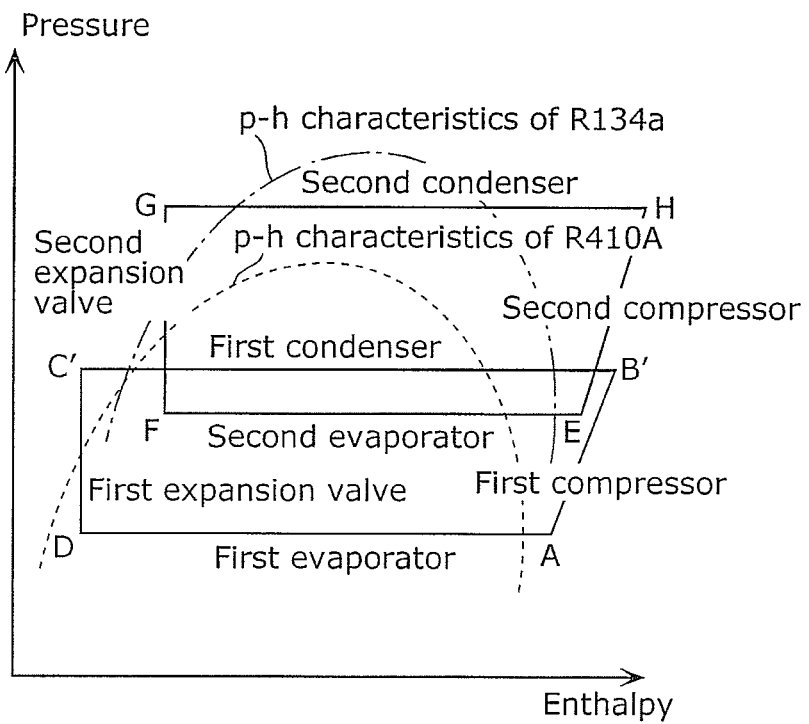
FIG. 9B is a p-h line diagram in the case of using the low-pressure heat pump cycle and a high-pressure heat pump cycle in combination in the second embodiment.

FIGS. 9A and 9B are diagrams showing, respectively, a heat pump cycle during the heating operation and a heat pump cycle during the heat storing operation, according to the second embodiment of the present invention. More specifically, FIG. 9A is a pressure-enthalpy diagram (p-h diagram) in the case of the heating operation, and FIG. 9B is a p-h diagram in the case of the heat storing operation.

FIG. 9A is a diagram for describing the case of operating only the low-pressure heat pump cycle. In addition, p-h characteristics of R410A that is an example of the refrigerant are shown by a dashed line. More specifically, R410A is in: a state of mixture of liquid and gas in a region inside the dashed line; a liquid state in a region on the left side of the dashed line; and a gas state in a region on the right side of the dashed line.

The liquid refrigerant, having exchanged heat with outside air in the first evaporator 51, turns into a low-temperature low-pressure vapor refrigerant (D to A). Next, the first compressor 52 compresses the low-temperature low-pressure vapor refrigerant into a high-temperature high-pressure vapor refrigerant (A to B). Next, the vapor refrigerant flowing into the third condenser 59 via the selector valve 60 exchanges heat with water flowing into the third condenser via the hot water selector valve 61, to become a low-temperature high-pressure liquid refrigerant (B to C). Furthermore, the low-temperature high-pressure liquid refrigerant turns into a low-temperature low-pressure liquid refrigerant in the first expansion valve 54 (C to D), and the low-temperature low-pressure liquid refrigerant is returned again to the first evaporator 51. With this, it is possible to obtain hot water of approximately 50° C. required for heating.

FIG. 9B describes the case of operating the low-pressure heat pump cycle and the high-pressure heat pump cycle in combination. In addition, the p-h characteristics of R410A that is an example of the refrigerant of the low-pressure heat pump cycle are shown by a dashed line, and p-h characteristics of R134a that is an example of the refrigerant of the high-pressure heat pump cycle are shown by a dashed-dotted line. More specifically, the refrigerant used for the high-pressure heat pump cycle (R134a) has higher p-h characteristics than those of the refrigerant (R410A) used for the low-pressure heat pump cycle.

The liquid refrigerant, having exchanged heat with the outside air in the first evaporator 51, turns into a low-temperature low-pressure vapor refrigerant (D to A). Next, the first compressor 52 compresses the low-temperature low-pressure vapor refrigerant into a high-temperature high-pressure vapor refrigerant (A to B'). Next, the vapor refrigerant flowing into the first condenser 53 via the selector valve 60 exchanges heat with the liquid refrigerant of the high-pressure heat pump cycle flowing into the second evaporator 55, and turns into a low-temperature high-pressure liquid refrigerant (B' to C'). Furthermore, the low-temperature high-pressure liquid refrigerant turns into a low-temperature low-pressure liquid refrigerant (C' to D) in the first expansion valve 54, and the low-temperature low-pressure liquid refrigerant is returned again to the first evaporator 51.

In the high-pressure heat pump cycle, the liquid refrigerant, having exchanged heat with the vapor refrigerant of the low-pressure heat pump cycle in the second evaporator 55, turns into a low-temperature low-pressure vapor refrigerant (F to E). Next, the second compressor 56 compresses the low-temperature low-pressure vapor refrigerant into a high-temperature high-pressure vapor refrigerant (E to H). Next, the vapor refrigerant flowing into the second condenser 57 exchanges heat with water flowing into the second condenser via the hot water selector valve 61, to be turned into a low-temperature high-pressure liquid refrigerant (H to G). Furthermore, the low-temperature high-pressure liquid refrigerant turns into a low-temperature low-pressure liquid refrigerant in the second expansion valve 58 (G to F), and the low-temperature low-pressure liquid refrigerant is returned again to the second evaporator 55.

This allows obtaining hot water of approximately 70° C., thus allowing storage of high-temperature hot water in advance for the shutoff hour. Note that the combination of the low-pressure heat pump cycle and the high-pressure heat pump cycle shown in FIG. 9B is used not only for the heat storing operation to deal with the shutoff hour. In other words, the combination is also useful when using a high-temperature hot water heating system in a house having poor heat insulating performance.

Figure 10:
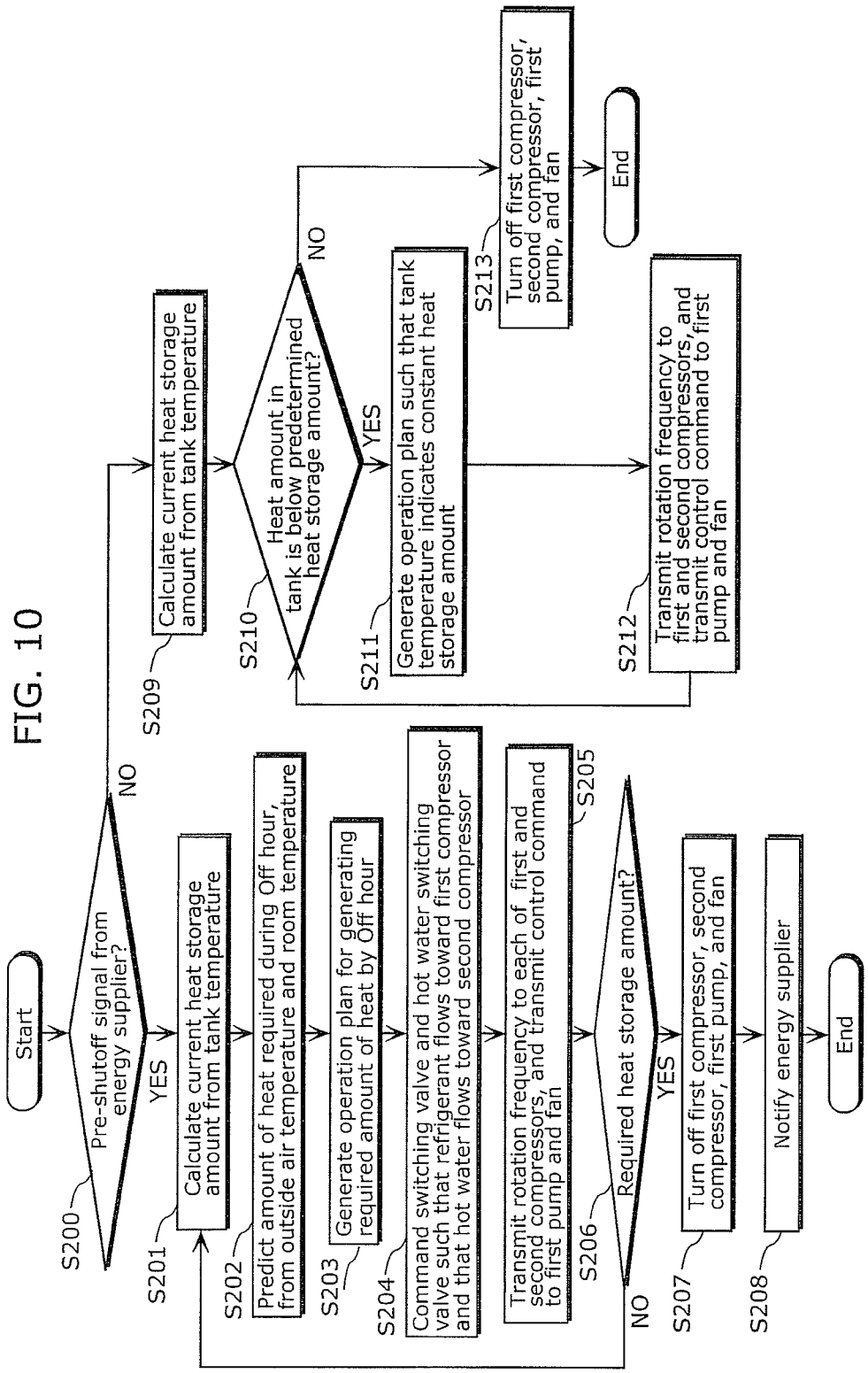
FIG. 10 is a flowchart showing an operation of the heat pump heating system according to the second embodiment.

FIG. 10 shows a control flowchart of the heat pump heating system 200 according to the second embodiment of the present invention.

The control switching unit 45 determines whether or not the communication unit 41 has received the pre-shutoff signal from the energy supplier 4 (S200), and continues the heating operation (S209) when the pre-shutoff signal is not received (S200: NO). Here, the control command from the control command unit 46 is intended for storing, in the tank 2, a predetermined amount of heat required for the heating.

In other words, the state detection unit 42 calculates the amount of the heat stored in the tank 2, based on the temperature of each of the upper, the middle, the lower portions of the tank 2 that has been detected by the heating temperature detection unit 13 (S209). Then, the state detection unit 42 determines whether or not the heat amount in the tank 2 is below a predetermined value (S210).

When the heat amount in the tank 2 is below the predetermined value (S210: YES), the operation planning unit 44 sets a rotation frequency of the first compressor 52, a rotation frequency of the second compressor 56, a flow amount of the first pump 18, a rotation frequency of the fan 22, and so on (S211) and the control command unit 46 transmits a control command to each of the constituent elements (S212), so as to generate an amount of heat that covers a shortfall such that the amount of heat more than or equal to a predetermined amount of heat is stored. When the amount of the generated heat is more than or equal to the predetermined value (S210: NO), the control command unit 46 determines that further heat storage is not necessary, and stops the operations of the first compressor 52, the second compressor 56, the first pump 18, and the fan 22 (S213).

On the other hand, when the communication unit 41 receives the pre-shutoff signal from the energy supplier 4 (S200: YES), the control switching unit 45 gives priority to the heat storing operation. The control command unit 46 issues a control command based on the operation plan for storing the heating load required for the shutoff hour, which is set by the operation planning unit 44.

In other words, the state detection unit 42 calculates the amount of the heat stored in the tank 2, based on the temperature of each of the upper, the middle, the lower portions of the tank 2 that has been detected by the heating temperature detection unit 13 (S201). Next, the prediction unit 43 predicts the heating load required for the shutoff hour, based on the results obtained by the outside air temperature detection unit 10 and the room temperature detection unit 11 (S202).

Next, the operation planning unit 44 generates an operation planning for causing the heat pump 30 to generate, by the time the shutoff starts, an amount of heat equivalent to a difference between the amount of heat that is currently stored and the heating load required for the shutoff hour (S203). In other words, the amount of heat to be generated in S203 equals the amount of heat calculated by adding the amount of heat equivalent to the difference to the amount of the heat required for maintaining the room temperature at the set temperature. In addition, as the operation planning method, for example, it is preferable to operate the heat pump 30 when the COP of the heat pump 30 is in a highest possible state. For example, it is preferable to operate the heat pump 30 when the outside air temperature is high.

The control command unit 46 controls the first compressor 52, the second compressor 56, the first pump 18, the fan 22, and so on, based on the operation plan thus obtained (S205). In this case, the control order unit 46 switches the selector valve 60 such that the refrigerant flows toward the first condenser 53, and switches the hot water selector valve 61 such that the hot water flows toward the second condenser 57 (S204).

The processing above is repeated until the required amount of heat is stored in the tank 2 (S206: NO), and when the required amount is reached (S206: YES), the supply of electricity to the first compressor 52, the second compressor 56, the first pump 18, and the fan 22 is suspended (S207), and the energy supplier 4 is notified of the suspension (S208).

Figure 11A:
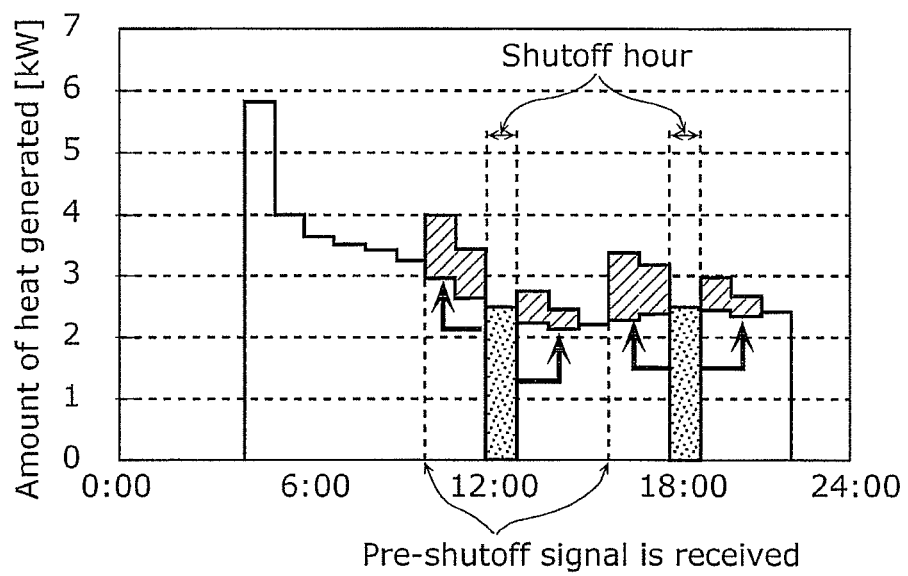
FIG. 11A a diagram showing an example of an amount of heat generated in the case of using only the low-pressure heat pump cycle in the second embodiment.
Figure 11B:
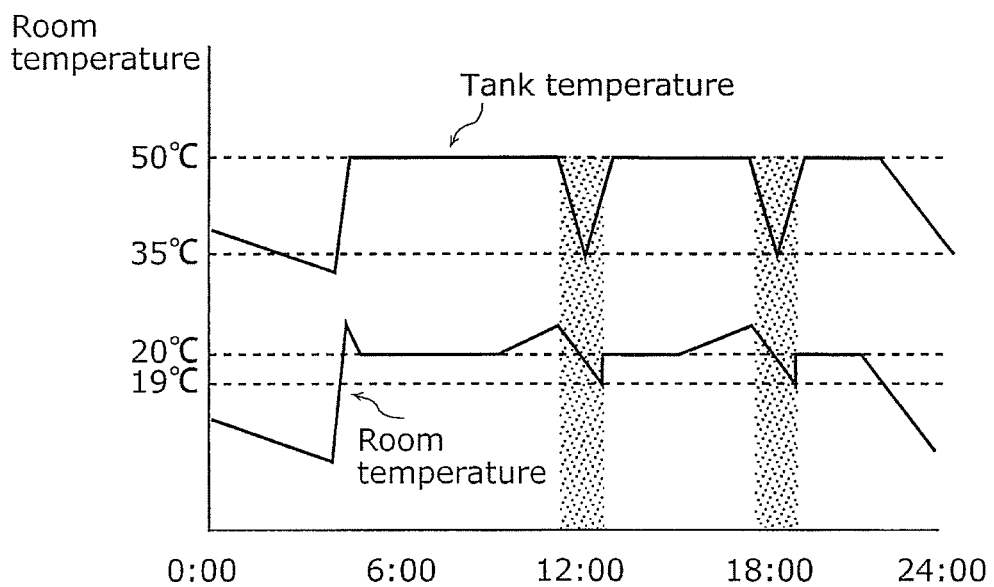
FIG. 11B is a diagram showing an example of room temperature and temperature in a tank in the case of using only the low-pressure heat pump cycle in the second embodiment.

FIGS. 11A and 11B are diagrams for describing an amount of heat generated in the case of using only the low-pressure heat pump cycle (FIG. 11A) and change in the room temperature and the temperature in the tank (FIG. 11B), in the heat pump heating system 200 according to the second embodiment of the present invention. Specifically, FIGS. 11A and 11B show examples where the temperature of the hot water in the tank 2 is the same during the heating operation and the heat storing operation, that is, the cases where both the temperature during the heating operation and the temperature during the heat storing operation are approximately 50° C.

Figure 12A:
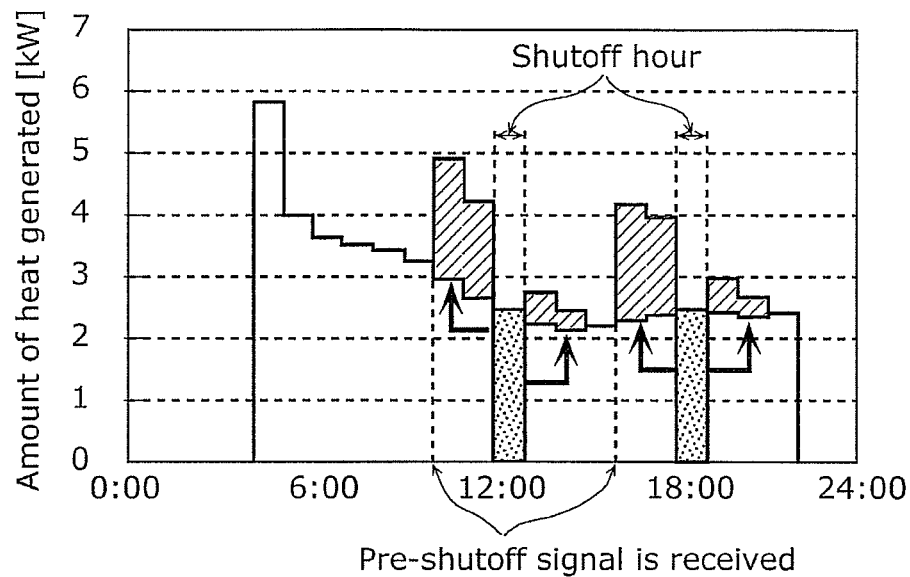
FIG. 12A a diagram showing an example of an amount of heat generated in the case of cascade-connecting the low-pressure heat pump cycle and the high-pressure heat pump cycle in the second embodiment.
Figure 12B:
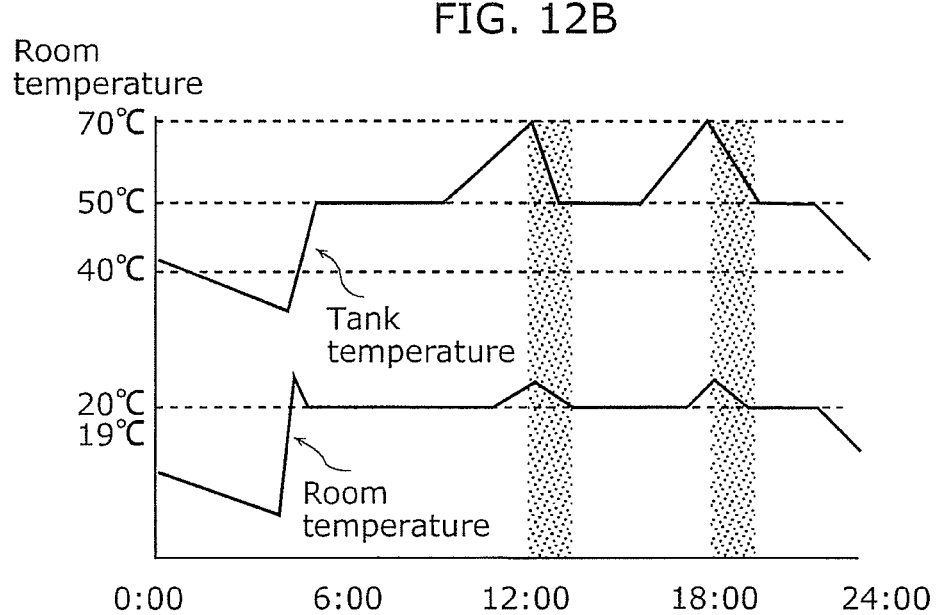
FIG. 12B is a diagram showing an example of the room temperature and the temperature in the tank in the case of cascade-connecting the low-pressure heat pump cycle and high-pressure heat pump cycle in the second embodiment.

In addition, FIGS. 12A and 12B are diagrams describing, in the case of using the low-pressure heat pump cycle and the high-pressure heat pump cycle in combination, an amount of heat generated (FIG. 12A) and change in the room temperature and the temperature in the tank (FIG. 12B), in the heat pump heating system 200 according to the second embodiment of the present invention.

Specifically, FIGS. 12A and 12B show the case where the temperature for the heat storing operation is set higher than the temperature for the heating operation, for example, where the temperature for the heating operation is approximately 50° C. and the temperature for the heat storing operation is approximately 70° C.

In addition, as shown in FIGS. 11A and 12A, the shutoff hour is carried out two times a day, for one hour each time from 12:00 to 13:00 and from 18:00 to 19:00 as with the case of FIG. 6A. In addition, the pre-shutoff signal is received at 10:00 and 16:00.

When comparing FIGS. 11A and 12A, a larger amount of heat is generated immediately before the shutoff hour (a shadowed portion) in FIG. 12A. As a result, when comparing the change in temperature in the tank 2, between FIGS. 11B and 12B, the temperature of the hot water immediately before the shutoff hour is 50° C. in FIG. 11B, whereas the temperature of the hot water immediately before the shutoff hour is as high as 70° C. in FIG. 12B. For this reason, when comparing, between FIGS. 11B and 12B, the amount of heat that can be stored in advance before the shutoff hour, a larger amount of heat can be stored in FIG. 12B. Thus, as is clear from the comparison in change in room temperature between FIGS. 11B and 12B, it is possible to avoid a decrease in room temperature during the shutoff hour. This allows dealing with the shutoff without compromising comfort.

Note that the generation of the high-temperature hot water during the heat storing operation can be realized by cascade-connecting the low-pressure heat pump cycle and the high-pressure heat pump cycle in the second embodiment, but this is not the only case. For example, in the single heat pump cycle such as R407C and R774, the temperature of the hot water to be generated may be switched between the time of heating and the time of storing heat.

As described thus far, as shown in FIGS. 11B and 12B, the heat pump heating system 200 according to the second embodiment of the present invention can store, after notified of the shutoff hour in advance, high-temperature hot water in the tank 2 by the time the shutoff hour starts, thus avoiding a decrease in room temperature during the shutoff hour.

With this, it is possible to contribute to system power stabilization without compromising user comfort, thus allowing the user to enjoy the lower electricity rate. In this case, the amount of shutoff power which has contributed to system power stabilization is approximately 1.3 kW (5.72 kWh/(COP 2.2×2 hours).

INDUSTRIAL APPLICABILITY

A method of controlling a heat pump heating apparatus according to the present invention is applicable as a heating system that contributes to system power stabilization.

REFERENCE SIGNS LIST 1, 30 Heat pump
2 Tank
3 Radiator
4 Energy supplier
5 Electric load
6 First wattmeter
7 Second wattmeter
8, 40 Heating system control unit
10 Outside air temperature detection unit
11 Room temperature detection unit
12 Heating flow detection unit
13 Heating temperature detection unit
14 Expansion valve
15 Compressor
16 Evaporator
17 Condenser
18 First pump
19 Mixing valve
20 Second pump
21 Control unit
22 Fan
51 First evaporator
52 First compressor
53 First condenser
54 First expansion valve
55 Second evaporator
56 Second compressor
57 Second condenser
58 Second expansion valve
59 Third condenser
60 Selector valve
61 Hot water selector valve
41, 81 Communication unit
42, 82 State detection unit
43, 83 Prediction unit
44, 84 Operation planning unit
45, 85 Control switching unit
46, 86 Control command unit 100 Heat pump heating apparatus
200 Heat pump heating system

The invention claimed is:

1. A heating system which receives a supply of electricity from a power supplier through a first power system and a second power system of which an electricity rate is lower than an electricity rate of the first power system, and maintains a temperature of a target within a predetermined range, said heating system comprising:
   a heat generator that generates heat, using the electricity supplied through the second power system;
   a heat storage that stores the heat generated by said heat generator;
   a heat radiator that radiates the heat stored in said heat storage; and
   a controller that controls, upon receiving the supply of electricity through the first power system, a radiation amount of the heat radiated from said heat radiator so as to maintain the temperature of the target within the predetermined range, and an amount of the heat generated by said heat generator,
   wherein when a signal is received from the power supplier, said controller causes said heat generator to generate additional heat during a period of time from when the signal is received to when the supply of electricity through the second power system is stopped, the signal indicating that the supply of electricity through the second power system is to be stopped after an elapse of a predetermined period of time, the additional heat being required while the supply of electricity through the second power system is being suspended.

2. The heating system according to claim 1, further comprising
   a predictor that predicts a radiation amount of the heat to be radiated from said heat radiator while the supply of electricity through the second power system is being suspended,
   wherein said controller controls said heat generator such that said heat storage stores an amount of heat during the period of time from when the signal is received to when the supply of electricity through the second power system is stopped, the amount of heat being equivalent to the radiation amount predicted by said predictor.

3. The heating system according to claim 2,
   wherein the signal includes information that specifies a shutoff hour that is a period of time during which the supply of electricity through the second power system is suspended,
   said heating system further comprises a detector that detects the temperature of the target and an outside air temperature, and
   said predictor predicts the radiation amount of the heat to be radiated from said heat radiator during the shutoff hour, based on the temperature of the target and the outside air temperature that have been detected by said detector.

4. The heating system according to claim 2, comprising:
   a heating apparatus which includes said heat generator, said heat storage, said heat radiator, and said controller; and
   a heating system controller that is a separate body from said heating apparatus and includes: said predictor; and an operation planner that generates an operation plan for causing said heat generator to generate the amount of heat equivalent to the radiation amount predicted by said predictor, and notifies said controller of the operation plan,
   wherein said controller, when receiving the operation plan from said operation planner, controls said heat generator in accordance with the operation plan.

5. The heating system according to claim 1,
   wherein said heat generator includes a heat pump cycle which includes:
   an evaporator which causes a liquid refrigerant to absorb heat from outside air so as to generate a vapor refrigerant;
   a compressor which compresses the vapor refrigerant generated by said evaporator;
   a condenser which causes heat exchange between the vapor refrigerant compressed by said compressor and a heat storage material held by said heat storage, and stores heat in the heat storage material; and
   an expansion valve which generates the liquid refrigerant by decreasing pressure of the vapor refrigerant, and
   at least said compressor is supplied with electricity through the second power system.

6. The heating system according to claim 5,
   wherein said heat generator further includes:
   a plurality of heat pump cycles each of which is said heat pump cycle; and
   a switch that switches between a first state and a second state, the first state being a state in which heat is generated using only one of said heat pump cycles, and the second state being a state in which heat is generated using said heat pump cycles that are cascade-connected, and
   said controller controls the amount of heat generated by said heat generator, using said switch.

7. The heating system according to claim 5,
   wherein said heat radiator includes:
   a mixing valve which mixes, at a mixture ratio that is predetermined, portions having different amounts of heat storage, of the heat storage material held by said heat storage;
   a radiator which is provided near the target and radiates the heat stored in the heat storage material; and
   a pump which supplies, to said radiator, the heat storage material mixed by said mixing valve,
   wherein said controller controls the radiation amount of the heat radiated from said heat radiator, by changing the mixture ratio of the portions of the heat storage material in said mixing valve.

8. A heating system control method for controlling a heating system which receives a supply of electricity from a power supplier through a first power system and a second power system of which an electricity rate is lower than an electricity rate of the first power system, and maintains a temperature of a target within a predetermined range, the heating system including: a heat generator which generates heat using the electricity supplied through the second power system; a heat storage which stores the heat generated by the heat generator; and a heat radiator which radiates the heat stored in the heat storage, said heating system control method comprising
   controlling, upon receiving the supply of electricity through the first power system, a radiation amount of the heat radiated from the heat radiator so as to maintain the temperature of the target within the predetermined range, and an amount of the heat generated by the heat generator,
   wherein when a signal is received from the power supplier, in said controlling, the heat generator is caused to generate additional heat during a period of time from when the signal is received to when the supply of electricity through the second power system is stopped, the signal indicating that the supply of electricity through the second power system is to be stopped after an elapse of a predetermined period of time, the additional heat being required while the supply of electricity through the second power system is being suspended.

9. The heating system control method according to claim 8, further comprising
predicting a radiation amount of the heat to be radiated from the heat radiator while the supply of the electricity through the second power system is suspended,
wherein in said controlling, the heat generator is controlled such that the heat storage stores an amount of heat equivalent to the radiation amount predicted in said predicting during the period of time from when the signal is received to when the supply of the electricity through the second power system is stopped.

10. The heating system control method according to claim 9,
wherein the heating system further includes a detector that detects the temperature of the target and an outside air temperature,
said heating system control method further comprises receiving, from the power supplier, the signal including information that specifies a shutoff hour that is a period of time during which the supply of the electricity through the second power system is suspended, and
in said predicting, when the signal is received, the radiation amount of the heat to be radiated from the heat radiator during the shutoff hour is predicted, based on the temperature of the target and the outside air temperature that have been detected by the detector.

11. The heating system control method according to claim 9, further comprising
generating an operation plan for generating, in the heat generator, the amount of heat during the period of time from when the signal is received to when the supply of electricity through the second power system is stopped, the amount of heat being equivalent to the predicted radiation amount,
wherein in said controlling, the heat generator is controlled in accordance with the operation plan generated in said generating.

12. The heating system control method according to claim 8,
wherein in said controlling, the heat generator is controlled such that the heat storage stores an amount of heat equivalent to a predetermined amount of heat storage, when the signal is not received from the power supplier, the signal indicating that the supply of electricity through the second power system is to be stopped after an elapse of a predetermined period of time.

13. The heating system control method according to claim 8,
wherein in said controlling, the heat generator is caused to generate the additional heat during the period of time from when the signal is received to when the supply of electricity through the second power system is stopped and after a shutoff hour, the additional heat being required while the supply of electricity through the second power system is being suspended, and
an amount of heat generated before the shutoff hour is larger than an amount of heat generated after the shutoff hour.

14. A heating system control method for controlling a heating system which receives a supply of electricity from a power supplier through a first power system and a second power system of which an electricity rate is lower than an electricity rate of the first power system, and maintains a temperature of a target within a predetermined range,
wherein the heating system includes a heat generator which generates heat using the electricity supplied through the second power system,
said heating system control method comprises
causing, when a signal is received from the power supplier, the heat generator to generate additional heat during a period of time from when the signal is received to when the supply of electricity through the second power system is stopped, the signal indicating that the supply of electricity through the second power system is to be stopped after an elapse of a predetermined period of time, the additional heat being required while the supply of electricity through the second power system is being suspended.

15. The heating system control method according to claim 14,
wherein the heating system further includes:
a heat storage which stores the heat generated by the heat generator; and
a heat radiator which radiates the heat stored in the heat storage.

* * * * *